(12) United States Patent
Sams

(10) Patent No.: US 7,758,738 B2
(45) Date of Patent: *Jul. 20, 2010

(54) SEPARATING MULTIPLE COMPONENTS OF A STREAM

(75) Inventor: Gary W. Sams, Tulsa, OK (US)

(73) Assignee: National Tank Company, Houston, TX (US)

( * ) Notice: Subject to any disclaimer, the term of this patent is extended or adjusted under 35 U.S.C. 154(b) by 145 days.

This patent is subject to a terminal disclaimer.

(21) Appl. No.: 12/048,707

(22) Filed: Mar. 14, 2008

(65) Prior Publication Data

US 2008/0156649 A1   Jul. 3, 2008

Related U.S. Application Data

(63) Continuation of application No. 11/057,900, filed on Feb. 15, 2005, now Pat. No. 7,351,320, which is a continuation-in-part of application No. 10/214,295, filed on Aug. 7, 2002, now Pat. No. 6,860,979.

(51) Int. Cl.
C10G 33/02 (2006.01)
B01D 17/06 (2006.01)

(52) U.S. Cl. .......... 204/556; 204/565; 204/573; 204/663

(58) Field of Classification Search ........ 204/565, 204/556

See application file for complete search history.

(56) References Cited

U.S. PATENT DOCUMENTS

| | | | |
|---|---|---|---|
| 1,116,299 A | 11/1914 | Laird et al. | |
| 1,276,387 A | 8/1918 | McKibben | |
| 1,838,931 A | 12/1931 | Fisher | |
| 2,120,932 A | 6/1938 | Dillon | |
| 2,849,395 A | 8/1958 | Wintermute | |
| 3,772,180 A | 11/1973 | Prestridge | |
| 3,839,176 A | 10/1974 | McCoy et al. | |
| 3,847,775 A | 11/1974 | Prestridge | |
| 4,126,537 A | 11/1978 | Prestridge | |
| 4,161,439 A | 7/1979 | Warren et al. | |

(Continued)

FOREIGN PATENT DOCUMENTS

GB      1205562      6/1966

OTHER PUBLICATIONS

International Search Report and Written Opinion issued by the International Searching Authority (ISA/US) on Apr. 23, 2009 in corresponding PCT/US09/36475; 9 pages.

*Primary Examiner*—Patrick Ryan
*Assistant Examiner*—William T Leader
(74) *Attorney, Agent, or Firm*—Gable Gotwals

(57) ABSTRACT

A method of separating gaseous components, heavier liquid components and lighter liquid components of a stream including the steps of conducting the stream between spaced apart electrodes in a treatment vessel, supplying from a voltage source an AC voltage of at least one base frequency $F_1$ to at least one of the electrodes to establish an electric field within the vessel through which the stream passes, modulating the frequency $F_1$ of the AC voltage at a modulation frequency $F_2$, and withdrawing separated gaseous components from an upper portion of the vessel, heavier stream components from a lower portion of the vessel, and lighter liquid components from an intermediate portion of said vessel.

20 Claims, 13 Drawing Sheets

U.S. PATENT DOCUMENTS

| | | |
|---|---|---|
| 4,200,516 A | 4/1980 | Pope |
| 4,204,934 A | 5/1980 | Warren et al. |
| 4,224,124 A | 9/1980 | Pope |
| 4,283,290 A | 8/1981 | Davies |
| 4,290,882 A | 9/1981 | Dempsey |
| 4,308,127 A | 12/1981 | Prestridge et al. |
| 4,400,253 A | 8/1983 | Prestridge et al. |
| 4,415,426 A | 11/1983 | Hsu et al. |
| 4,417,971 A | 11/1983 | Ferrin et al. |
| 4,419,200 A | 12/1983 | Hsu et al. |
| 4,469,582 A | 9/1984 | Sublette et al. |
| 4,479,164 A | 10/1984 | Siegel |
| 4,581,119 A | 4/1986 | Rajani et al. |
| 4,581,120 A | 4/1986 | Sublette |
| 4,601,834 A | 7/1986 | Bailes et al. |
| 4,606,801 A | 8/1986 | Prestridge et al. |
| 4,702,815 A | 10/1987 | Prestridge et al. |
| 4,747,921 A | 5/1988 | Bailes et al. |
| 4,767,515 A | 8/1988 | Scott et al. |
| 4,804,453 A | 2/1989 | Sublette et al. |
| 4,919,777 A * | 4/1990 | Bull ......................... 204/563 |
| 5,147,045 A | 9/1992 | Chi et al. |
| 5,411,651 A | 5/1995 | Yamaguchi et al. |
| 5,421,972 A | 6/1995 | Hickey et al. |
| 5,464,522 A | 11/1995 | MacEdmondson |
| 5,543,027 A | 8/1996 | Yamaguchi et al. |
| 5,565,078 A | 10/1996 | Sams et al. |
| 5,575,896 A | 11/1996 | Sams et al. |
| 5,643,431 A | 7/1997 | Sams et al. |
| 5,738,766 A | 4/1998 | Jefferson |
| 5,824,203 A | 10/1998 | Remo |
| 6,010,634 A | 1/2000 | Sams et al. |
| 6,113,765 A | 9/2000 | Wagner et al. |
| 6,860,979 B2 | 3/2005 | Sams |
| 7,351,320 B2 * | 4/2008 | Sams ......................... 204/556 |
| 2005/0145509 A1 | 7/2005 | Sams |

* cited by examiner

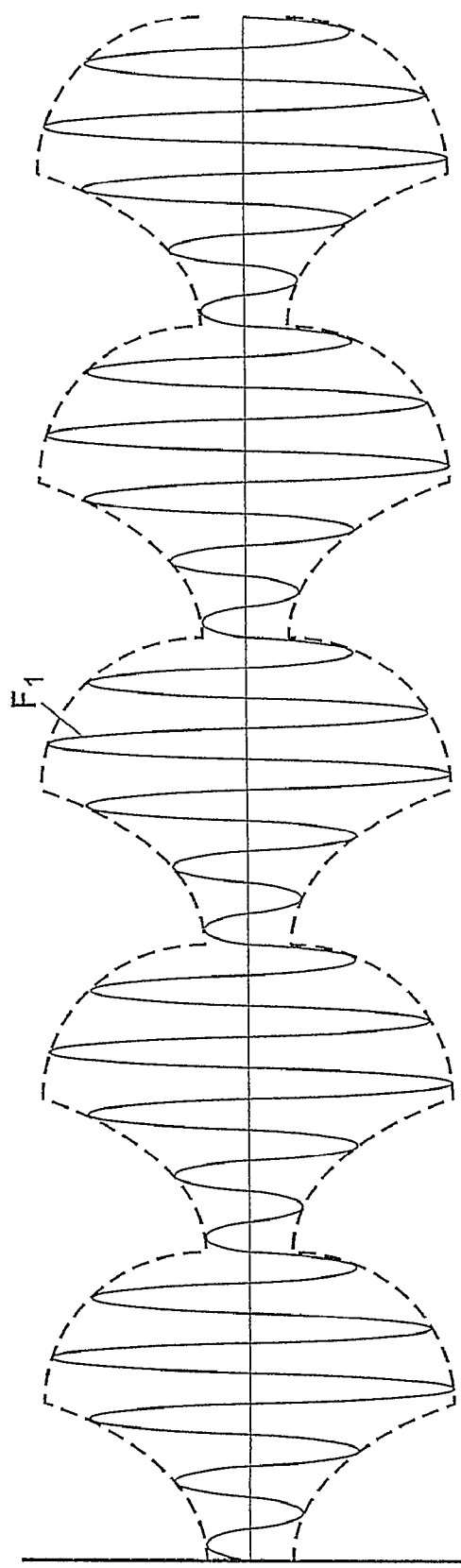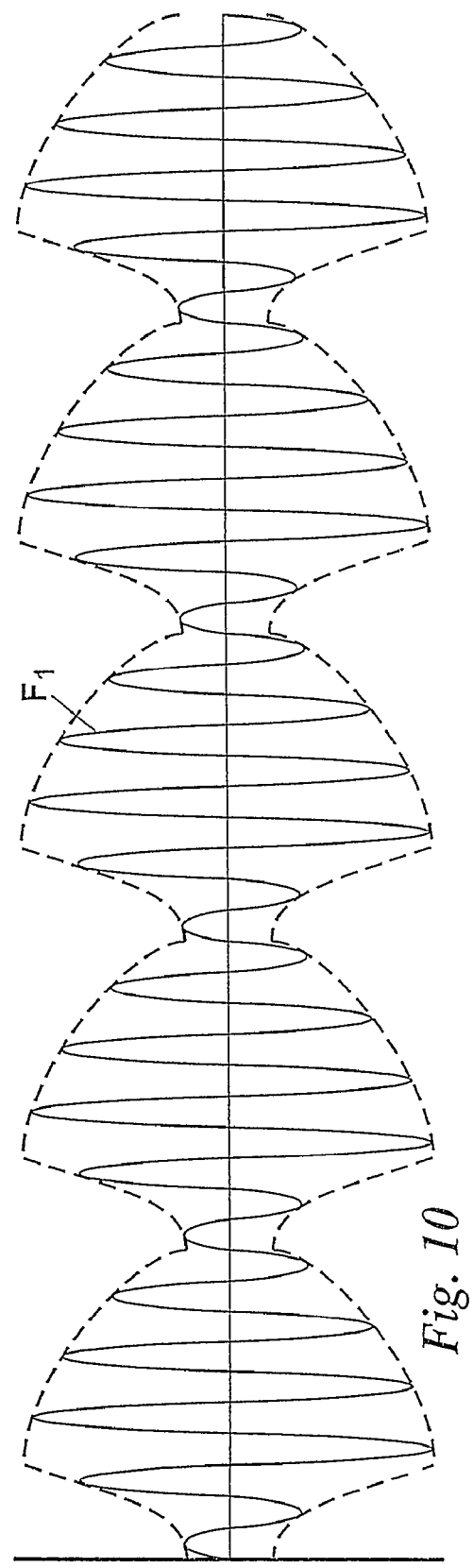

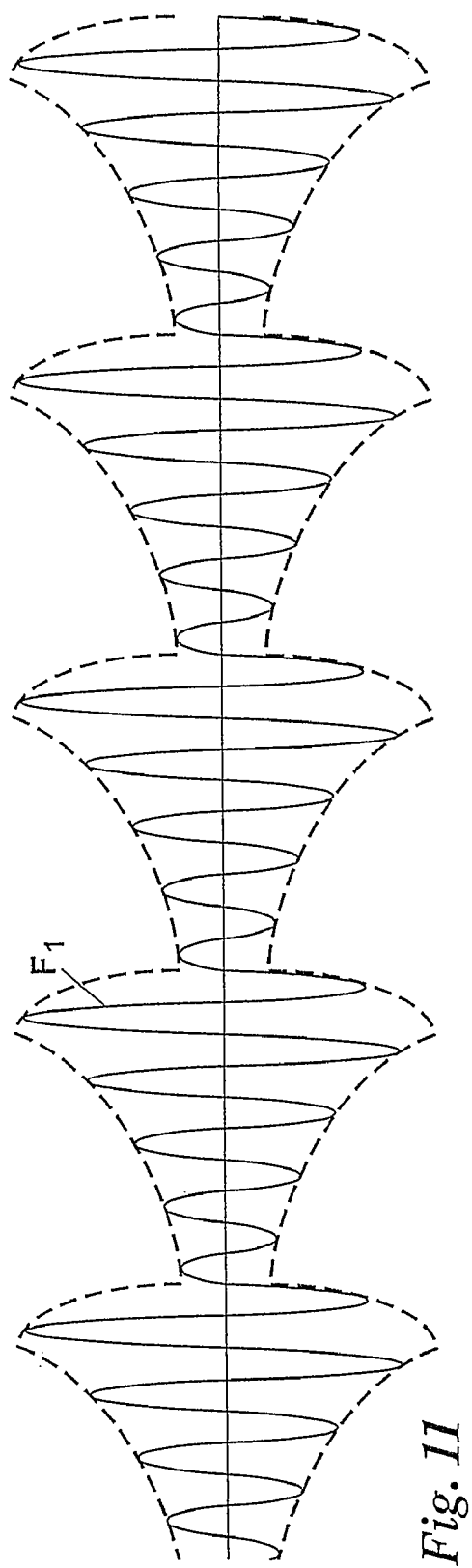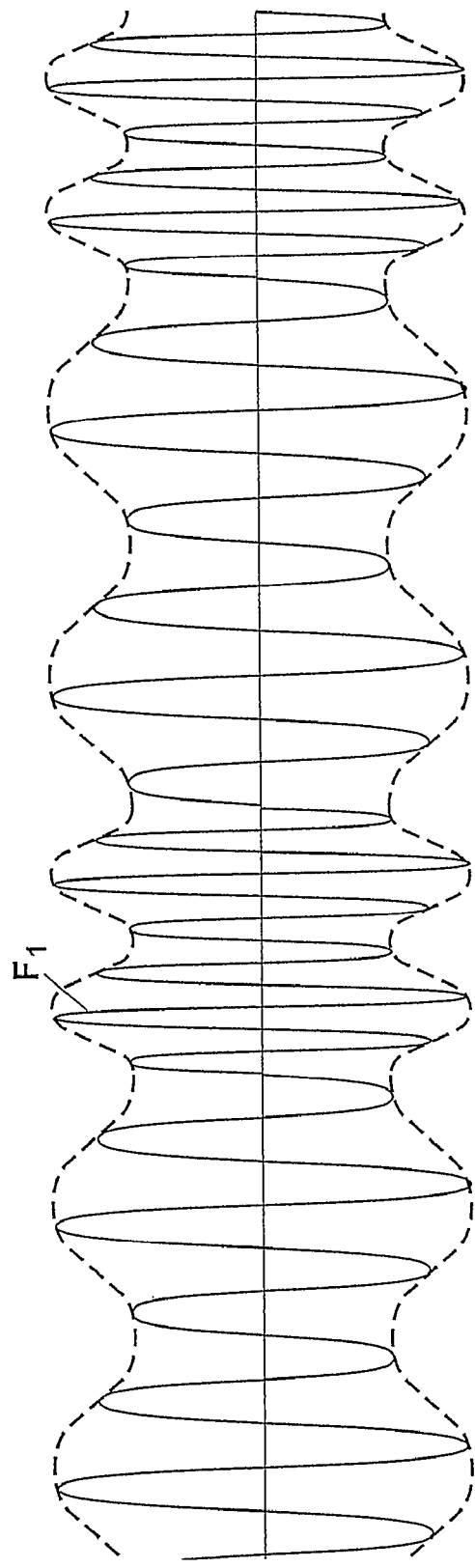

SEPARATING MULTIPLE COMPONENTS OF A STREAM

CROSS REFERENCE TO RELATED APPLICATIONS

This is a continuation application based on U.S. patent application Ser. No. 11/057,900, filed Feb. 15, 2005, entitled "Multiple Frequency Electrostatic Coalescence", now U.S. Pat. No. 7,351,320, which was a continuation-in-part application based on U.S. patent application Ser. No. 10/214,295, filed Aug. 7, 2002, now U.S. Pat. No. 6,860,979.

(1) FIELD OF THE INVENTION

This invention is in the field of electrostatic coalescence of an immiscible component of an emulsion, and is particularly related to coalescence of water droplets in an oil emulsion as is commonly encountered in crude oil.

STATEMENT REGARDING FEDERALLY SPONSORED RESEARCH OR DEVELOPMENT

The subjects of this application are not related to any subsisting federally sponsored research on development and this application is not referenced in any microfiche appendix.

(2) DESCRIPTION OF RELATED ART

Since the dawn of the petroleum industry, a continuous problem has been separation of oil and water. Nearly all crude oil produced in the world arrives at the earth's surface as a combination of oil and water. In some crude oil, water may be a rather minor component but in most it is a significant component. Further, separation of oil and water is made more difficult when the base fluid is an emulsion wherein water is in small droplets suspended in an oil base.

The basic mechanism by which water is separated from oil is by the use of gravity. Most oil production, after arriving at the earth's surface, is passed through a separator—that is, a vessel in which the crude oil is introduced. The vessel establishes a relative quiescence zone which allows the water to settle to the bottom and oil to raise to the top in the same way that cream rises in milk. Water is drawn from the bottom and oil from the top of the separator. With some crude oils, gravitational separation works efficiently but with other crude oil it is more difficult. It is apparent that if water and oil are not highly emulsified—that is, if water is not in the form of very small or even microscopic droplets, gravitational separation is effective. However, in many applications, water is so finely dispersed in an oil base that gravitational separation is not completely effective, in which case, additional treatment techniques are required.

One standard technique for improving the effectiveness of oil/water separation is by the use of coalescence. By various techniques, small water droplets suspended in oil can be caused to coalesce—that is, to join together to form larger water deposits. As water droplet size increases, the dynamics of gravitational separation improve—that is, large water droplets more freely fall out of an emulsion compared to small water droplets. Treating oil and water emulsions by coalescence is a technique that has long been employed in the petroleum industry.

A basic coalescence concept is to pass an emulsion through an established electric field. A typical way of establishing an electric field is to position spaced apart electrodes, normally metal plates, within the interior of a vessel located so that at least a portion of the emulsion passes between them as the emulsion moves through the vessel. Some vessels constructed to augment separation by electrostatic coalescence have a single input and a single output so that no actual separation occurs within the vessel. Such equipment for coalescing can be used in advance of another piece of equipment wherein actual separation of water and oil takes place. For instance, an electrostatic coalescer in which no separation takes place can be used in advance of a hydrocyclone, sometimes referred to as a vortex tube. The emulsion is treated by subjection to an electric field to augment the size of water droplets prior to passage of the emulsion into the hydrocyclone so that the increased size droplets are more efficiently separated by cyclonic action. The same piece of equipment can be used for passing an emulsion through an electric field before conveying the emulsion into a separation vessel wherein separation takes place by gravity. However, the most frequently employed equipment for treating an emulsion with an electric field is to provide spaced apart plates within a vessel in which the vessel has an emulsion inlet, an upper lighter component (oil) outlet and a lower heavier component (water) outlet. In this way, coalescence and separation are achieved in the same vessel.

A typical system for coalescing heavier and lighter components of an emulsion is illustrated in U.S. Pat. No. 4,400,253 entitled: "Voltage Control System for Electrostatic Oil Treater", having issued on Aug. 23, 1983. In this disclosure, the electric field intensity increases then decreases periodically to augment coalescence. U.S. Pat. No. 4,417,971 entitled: "Circuit for Maintaining the Strength of an Electrostatic Field Generated in a Fluid Mixture of Varying Dielectric Strength" issued on Nov. 29, 1983 teaches a system of enhancing coalescence using electric fields in which rectifiers are arranged to maintain the strength of an electrostatic field as the dielectric strength of the liquid mixture changes.

The present invention is a method and a system of augmenting the separation of immiscible heavier and lighter components of an emulsion including the steps of introducing the emulsion into a vessel having an electric field therein to which the emulsion is subjected while varying the electric field at a base frequency and modulating the field to enhance coalescence. Modulation may be in the form of amplitude modulation, frequency modulation or combined amplitude and frequency modulation.

Additional background information relating to the separation of heavier and lighter components of an emulsion can be obtained from the following United States patents:

| Patent no. | Inventor | Title |
| --- | --- | --- |
| 1,116,299 | Laird et al. | Process of Treating Petroleum Emulsions |
| 1,276,387 | McKibben | Method of Separating Associated Liquids |
| 1,838,931 | Fisher | Apparatus For Connecting Commercial Frequency Circuits Into High Frequency Circuits |

-continued

| Patent no. | Inventor | Title |
|---|---|---|
| 2,120,932 | Dillon | High Frequency Induction Dehydrator |
| 2,849,395 | Wintermute | Method and Apparatus for Electrical Separation of Emulsions |
| 3,772,180 | Prestridge | Electric Treater |
| 3,839,176 | McCoy et al. | Method and Apparatus for Removing Contaminants from Liquids |
| 3,847,775 | Prestridge | Process for Electrical Coalescing of Water |
| 4,126,537 | Prestridge | Method and Apparatus for Separation of Fluids with an Electric Field |
| 4,161,439 | Warren et al. | Apparatus for application of Electrostatic Fields to Mixing and Separating Fluids |
| 4,200,516 | Pope | Electrostatic Coalescing System |
| 4,204,934 | Warren et al. | Process for Application of Electrostatic Fields to Mixing and Separating Fluids |
| 4,224,124 | Pope | Electrostatic Coalescing System |
| 4,283,290 | Davies | Purification Utilizing Liquid Membrane with Electrostatic Coalescence |
| 4,290,882 | Dempsey | Electrostatic Separation of Impurities Phase from Liquid-Liquid Extraction |
| 4,308,127 | Prestridge et al. | Separation of Emulsions with Electric Field |
| 4,400,253 | Prestridge et al. | Voltage Control System for Electrostatic Oil Treater |
| 4,415,426 | Hsu et al. | Electrodes for Electrical Coalescense of Liquid Emulsions |
| 4,417,971 | Ferrin et al. | Circuit for Maintaining the Strength of an Electrostatic Field Generated in a Fluid Mixture of Varying Dielectric Strength |
| 4,469,582 | Sublette et al. | Electrically Enhanced Inclined Plate Separator |
| 4,479,164 | Siegel | Control for an Electrostatic Treater |
| 4,581,119 | Rajani et al. | Apparatus for Separating a Dispersed Liquid Phase from a Continuous Liquid Phase by Electrostatic Coalescence |
| 4,581,120 | Sublette | Method and Apparatus for Separating Oilfield Emulsions |
| 4,601,834 | Bailes et al. | Settling of Liquid Dispersions |
| 4,606,801 | Prestridge et al. | Electrostatic Mixer/Separator |
| 4,702,815 | Prestridge et al. | Distributed Charge Composition Electrodes and Desalting System |
| 4,747,921 | Bailes et al. | Liquid-Liquid Contacting |
| 4,767,515 | Scott et al. | Surface Area Generation and Droplet Size Control in Solvent Extraction Systems Utilizing High Intensity Electric Fields |
| 4,804,453 | Sublette et al. | Resolution of Emulsions with Multiple Electric Fields |
| 5,147,045 | Chi et al. | Particulate Separations by Electrostatic Coalescence |
| 5,411,651 | Yamaguchi et al. | Method for Electrostatic Liquid/Liquid Contractor |
| 5,421,972 | Hickey et al. | Process and Apparatus for Removing Soluble Contaminants from Hydrocarbon Streams |
| 5,464,522 | MacEdmondson | Electrostatic Oil Emulsion and Treating Method and Apparatus |
| 5,543,027 | Yamaguchi et al. | Apparatus for Electrostatic Liquid/Liquid Contactor |
| 5,565,078 | Sams et al. | Apparatus for Augmenting the Coalescence of Water in a Water-In-Oil Emulsion |
| 5,575,896 | Sams et al. | Method and Apparatus for Oil/Water Separation Using a Dual Electrode Centrifugal Coalescer |
| 5,643,431 | Sams et al. | Method for Augmenting the Coalescence of Water In A Water-In-Oil Emulsion |
| 5,824,203 | Remo | Method and Means for Changing Characteristics of Substances |
| 6,010,634 | Sams et al. | System and Method For Separating Mingled Heavier And Lighter Components Of A Liquid Stream |
| 6,113,765 | Wagner et al. | Methods for Enhanced Resolution of Hydrocarbon Continuous Emulsions or Dispersions with Conductivity Modifiers |
| GB 1,205,562 | Thornton et al. | Liquid/Fluid Extraction Process |

BRIEF SUMMARY OF THE INVENTION

The invention herein provides a method and a system for augmenting the separation of an emulsion—that is, the separation of immiscible heavier and lighter components of an emulsion. The method includes the step of passing the emulsion into a treatment vessel. An electric field is established within the vessel. The electric field is varied at a preselected base frequency $F_1$. The intensity of the electric field is modulated. The method of modulation may be selected from: (a) amplitude modulation; (b) frequency modulation; and (c) combined amplitude and frequency modulation. Thus the field is of multiple frequency and the method may be considered multiple frequency electrostatic coalescence.

The basic system of this invention includes a vessel having an emulsion inlet and at least one fluid outlet. Electrodes established within the vessel provide a treatment area therebetween through which at least some of the emulsion passes as it flows between the emulsion inlet and the fluid outlet. Circuitry connected to the electrodes provides at least one electric field within the treatment area, the circuitry serving to vary the electric field at a base frequency $F_1$ that is modulated in amplitude, in frequency or is modulated both in amplitude and frequency.

Further objects and features of the present invention will be apparent to those skilled in the art upon reference to the accompanying drawings and upon reading the following description of the preferred embodiments.

BRIEF DESCRIPTION OF THE DRAWINGS

FIGS. 2A and 2B illustrate waveform patterns that are obtained when a rectifier is used in series with each electrode.

FIG. 3 shows the invention adaptable for use for desalting an emulsion in which fresh water is injected into the system for use in carrying away excessive salt from the emulsion while at the same time the electrostatic coalescing feature of the system reduces the amount of water contained in oil passing from the system.

In FIG. 6, the intensity or the amplitude of the base frequency $F_1$ is periodically rapidly increased and then slowly decreased. Generally speaking, when an emulsion passes through to an electric field of the type illustrated by FIG. 6 the increasing amplitude portion of the wave destabilizes water droplets while the decreasing amplitude portions of the voltage waveform results in coalescence of the droplets.

FIG. 9 shows a modulation pattern of an electrical signal that can be applied to spaced apart electrodes for coalescence of an emulsion in which the intensity of the base voltage $F_1$ increases exponentially and likewise decreases exponentially.

In FIG. 9 the exponential rate of increase and decrease are substantially the same.

FIG. 10 is comparable to FIG. 9 in that it shows a base frequency $F_1$ applied to the electrodes of an electrostatic coalescence system in which the intensity or amplitude of the waveform increases at a rapid exponential rate and decreases at a slow exponential rate.

FIG. 11 shows the obverse of FIG. 10 in which the base voltage increases in intensity at a slow exponential rate and decreases at a rapid exponential rate. Typically the waveform of FIG. 11 is used with a crude emulsion having high conductivity and the waveform of FIG. 10 would be used when the crude is of low conductivity. The waveform of FIG. 9 would typically be used when the crude has moderate conductivity.

FIG. 12 shows a voltage waveform that can be applied to electrodes in an emulsion in which the base waveform $F_1$ is sinusoidal and is frequency modulated that is varying from a relatively low to a relatively high frequency rate and at the same time is amplitude. FIG. 12 is an example of combined amplitude and frequency modulation.

FIG. 13 illustrates how the critical voltage changes according to droplet diameter and to the interfacial tension of the emulsion. This figure shows emulsions with three different interfacial tensions, that is, where the interfacial tension is 10 dynes per centimeter, 20 dynes per centimeter and 30 dynes per centimeter.

DETAILED DESCRIPTION OF THE PREFERRED EMBODIMENTS

Electric fields have been used for augmenting the coalescence of emulsions for many years. Electric fields have been used as established by steady state DC voltage potentials, alternating current potentials, rectified alternating current potentials, pulsed DC voltage potentials and combinations of these. The use of electric fields to augment coalescence has been particularly employed in the petroleum industry to aid in the separation of water and oil. Coalescence means the joining of small droplets together to form larger droplets.

In recent years, improved coalescence results have been obtained by using pulsed DC voltage fields. This technology is significant in high water content applications—that is, typically where the water is over thirty percent (30%) of the emulsion and where traditional electrostatic processes do not function consistently and effectively. In order to establish pulsed DC fields in an emulsion having high water content it is normally helpful to utilize insulated electrodes.

Figure 1:
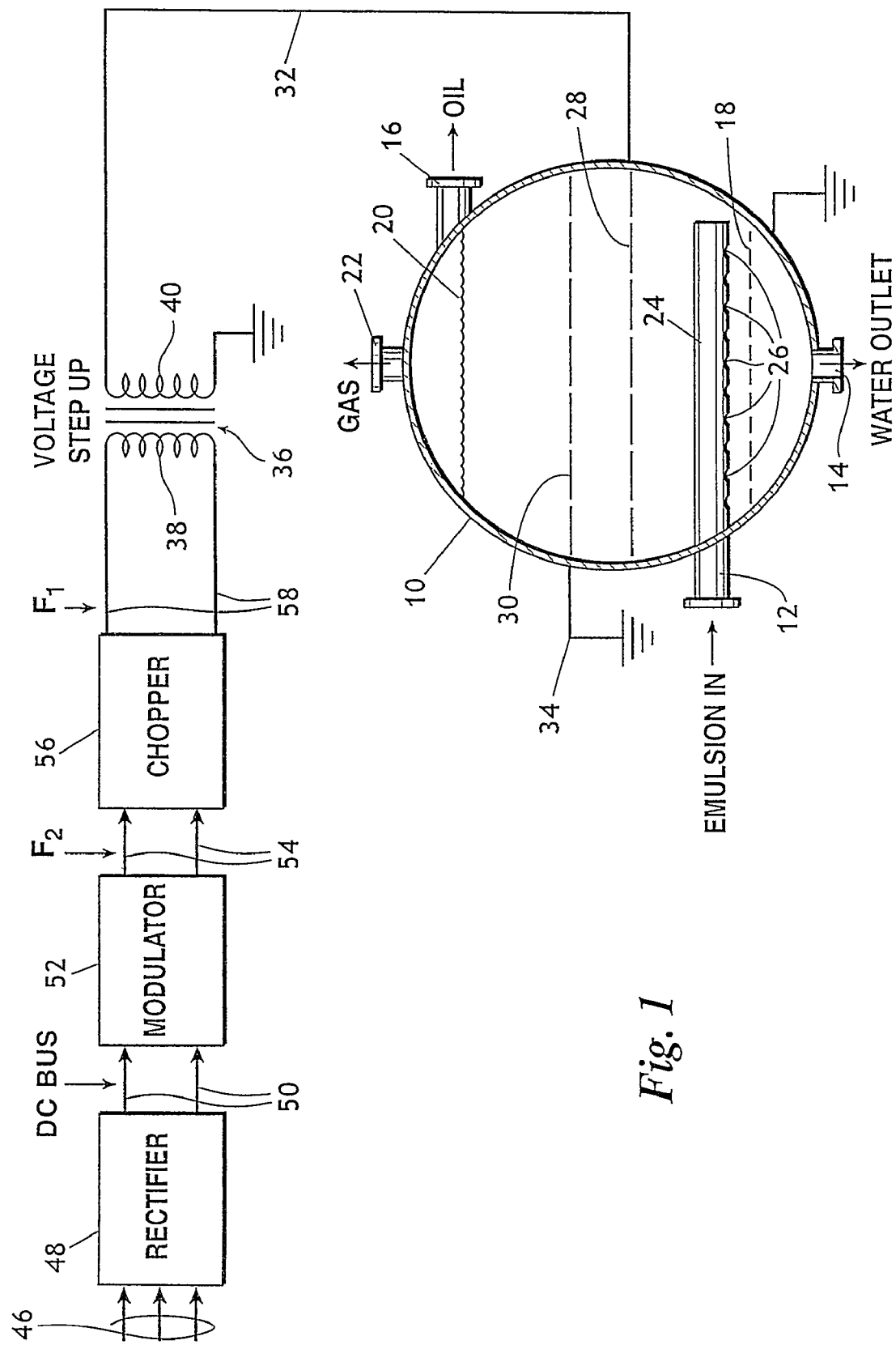
FIG. 1 is a schematic diagram showing a circuit for supplying electrical energy to spaced apart electrodes positioned in a treatment vessel. As emulsion flows in the treatment vessel, at least a portion thereof passes within the electric field created between the electrodes. The vessel includes a heavier component (water) outlet that is positioned in a lower portion of the vessel and a lighter component (oil) outlet positioned in an upper portion of the vessel. The circuitry of FIG. 1 varies the electric field established within the vessel between the electrodes at a base frequency $F_1$ that is modulated in multiple ways.

Referring to FIG. 1, a typical application of the present invention is diagrammatically illustrated. A vessel is indicated by the numeral 10 having an emulsion inlet 12, a heavy component (water) outlet 14 and a lighter component (oil) outlet 16. Coalescence can be employed to separate heavier and lighter components of various emulsions, however, the most widespread application of the technology is in the oil industry where coalescence is used to augment the separation of oil and water from crude oil. Most crude oil found in a subterranean formation arrives at the earth's surface as an emulsion containing both oil and water. At the surface and in various stages of transporting and refining of crude oil it is important to be able to separate out the water content. Thus the heavy component outlet 14 can typically be considered a water component outlet while the lighter component outlet 16 can typically be considered an oil outlet. This invention will be described as it is particularly applicable to emulsions, such as crude oil, wherein water is the heavier component, as is the usual situation. There are areas of the earth that produce heavy oil, that is a crude oil emulsion in which the emulsified water component is lighter than the hydrocarbon component. The methods and systems herein described can be applied to promote coalescence of water droplets in such heavy oil applications. A primary difference is that separated water is withdrawn from an upper portion of a vessel while heavy oil is taken from a lower portion but the methods of creating and using electrostatic fields to promote coalescence remain the same.

Within vessel 10 water is separated from the inlet emulsion by gravity forming an oil/water interface 18. Separated oil above interface 18 rising to a level 20, above which gas accumulates, the gas being withdrawn through gas outlet 22.

The emulsion inlet 12 is connected to one or more distributor pipes 24 which have small diameter outlet openings 26 through which emulsion enters into vessel 10. Distributor pipe 24 is representative of various fluid inlet systems designed to admit emulsion into vessel 10 while producing minimal turbulence.

Positioned within vessel 10 is a first electrode 28 and spaced from it, a second, ground electrode 30.

Electrodes 28 and 30 are perforated and are positioned within vessel 10 so that emulsion passes therethrough and therebetween as it progresses from inlet 12 to outlets 14 and 16. Electrodes 28 and 30 form an electric field that is above oil/water interface 18. To augment the formation of water droplets, electric energy is applied between electrodes 28 and 30. For this purpose, a first conductor 32 extends to electrode 28 and a second conductor 34 connects second electrode 30 to ground. Vessel 10 is at ground potential and therefore second electrode 30 can be directly connected to the interior of the vessel, eliminating the need for second conductor 34.

Electric potential is applied between electrodes 28 and 30 by means of a transformer 36 having a primary winding 38 and a secondary winding 40. Voltage across secondary winding 40 is fed between ground potential and conductor 32. If a steady state AC voltage is applied to primary winding 38 of transformer 36, the system for augmenting the separation of heavier and lighter components of an emulsion utilizing an electric field described to this point is standard procedure. However, the system of this invention is different essentially in the way in which electrical energy is applied to transformer primary winding 38.

Figure 2:
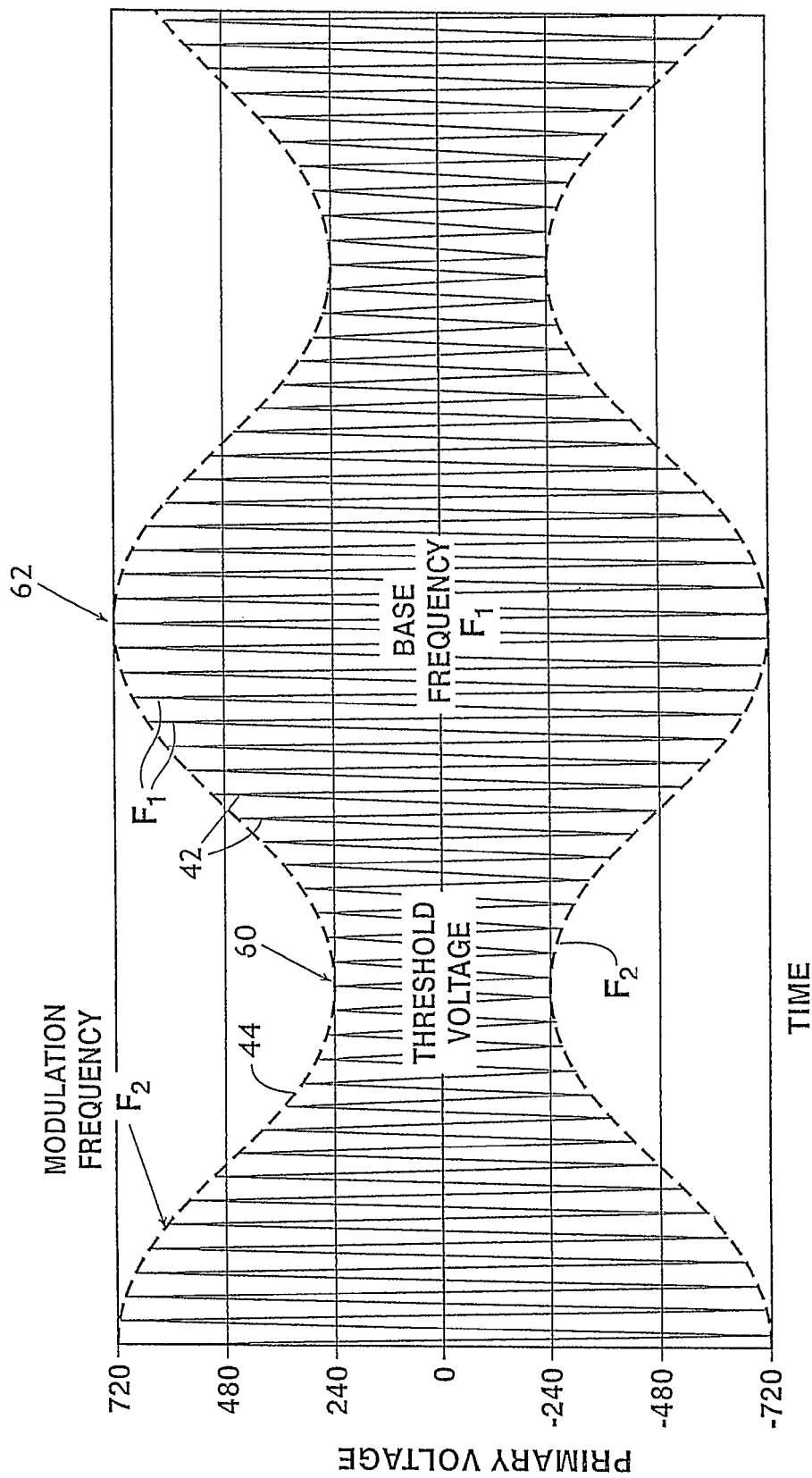
FIG. 2 is a representative wave form pattern of an electric potential applied to electrodes in a treatment vessel as used for practicing a method of this invention for augmenting the separation of immiscible heavier and lighter components of an emulsion. The graph of FIG. 2 shows a pattern of voltage that can be applied to spaced electrodes to create an electric field. The voltage pattern has a base frequency $F_1$ modulated in amplitude at a frequency $F_2$.

Before describing the elements of FIG. 1 that control the waveform of electrical energy applied to the primary of transformer 36 reference will now be had to FIG. 2. This figure shows a waveform in which voltage is the abscissa and time is the ordinate—that is, indicating how the amplitude or intensity of a base frequency varies with time. The voltage waveform consists of a base frequency indicated by waveform 42 (the frequency of wave form 42 will be referred to hereafter as $F_1$) and in which the intensity or amplitude of the base frequency is modulated at a frequency $F_2$. The amplitude of modulation if $F_1$ is the wave form 44—that is, the frequency of waveform 44 is $F_2$.

Figure 2A:
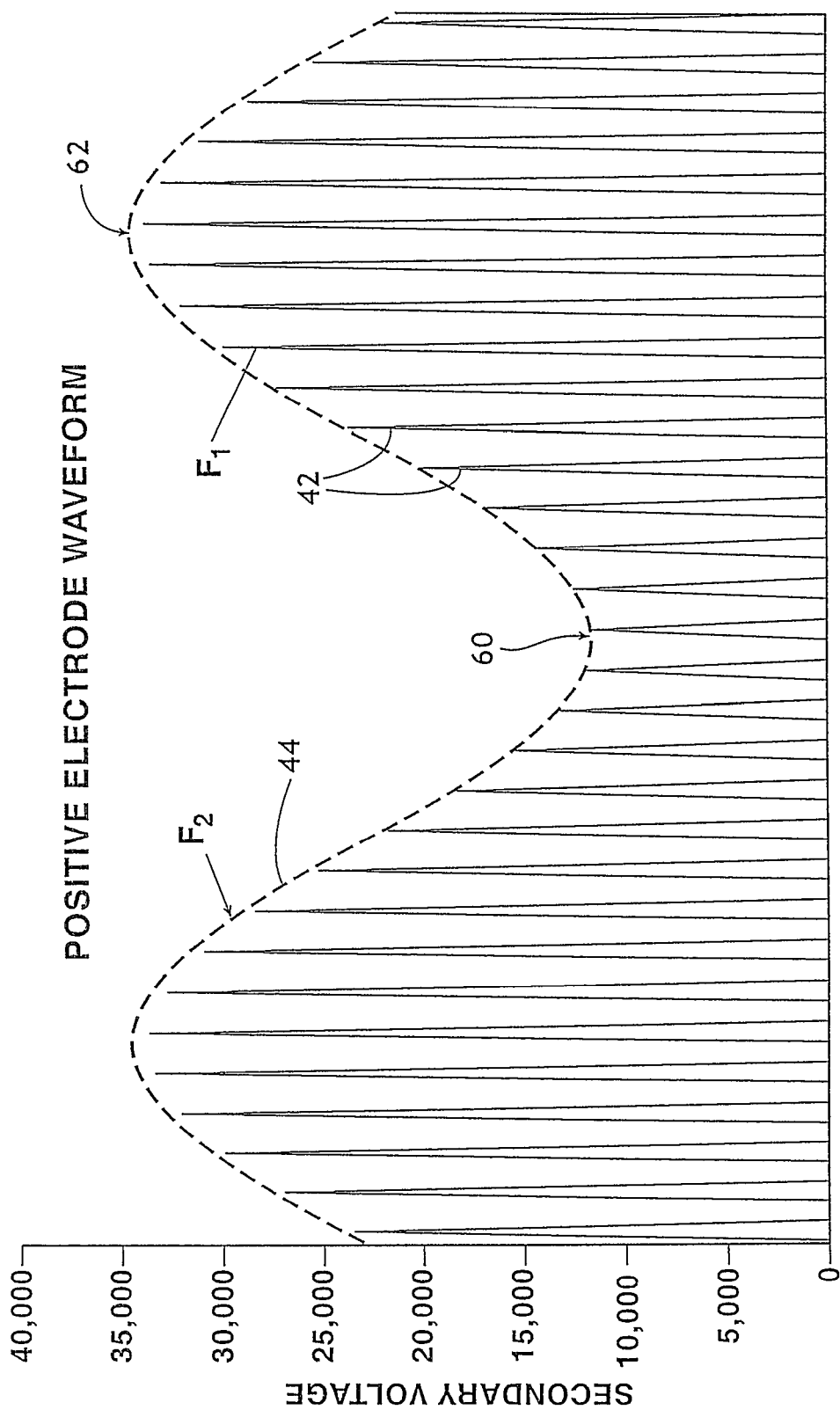
FIG. 2A shows the waveform of positive voltage provided at the secondary of a high voltage transformer for use in practicing the invention.
Figure 2B:
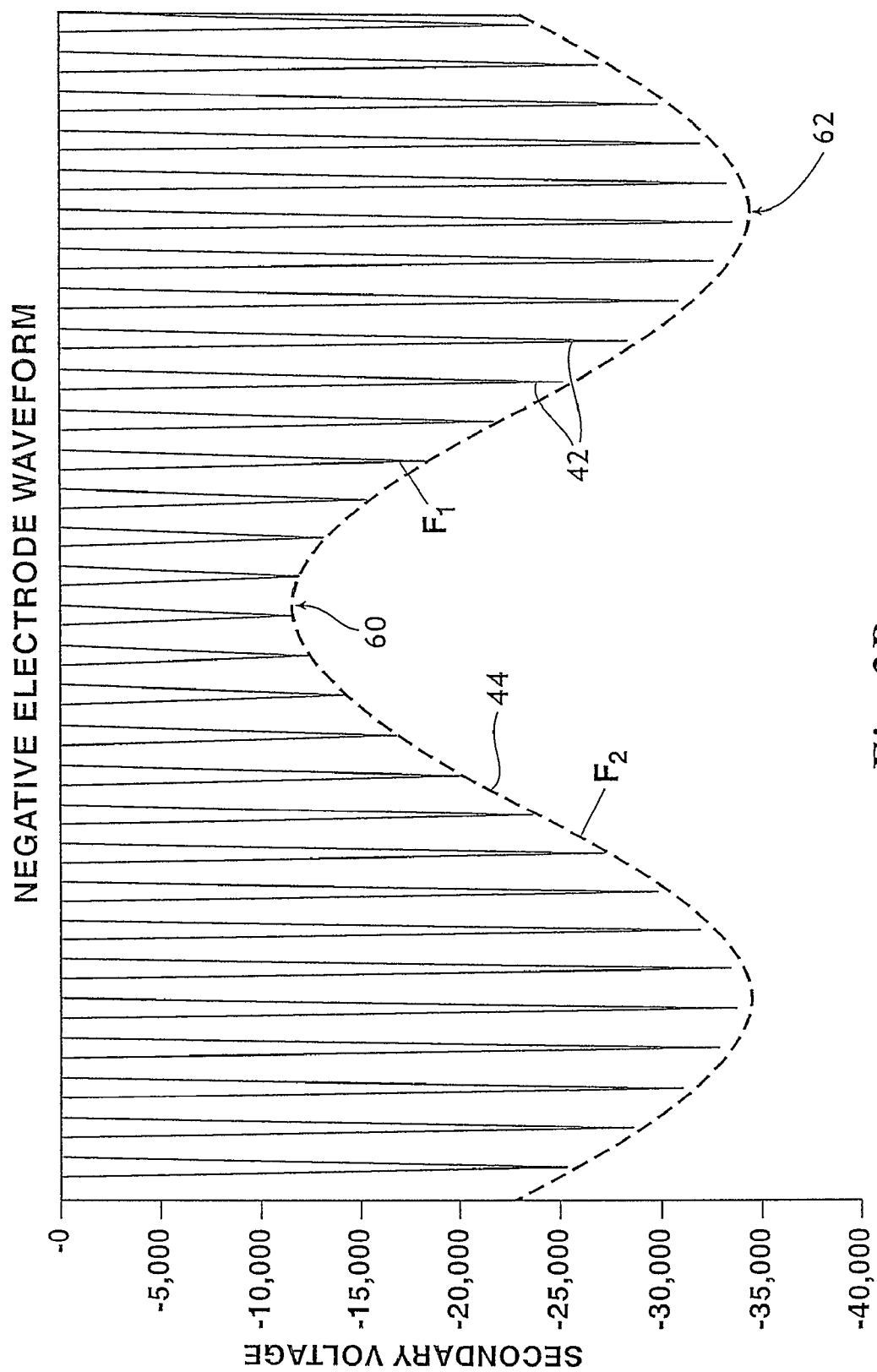
FIG. 2B shows the waveform of negative voltage at the secondary of a high voltage transformer as used in practicing the invention.
Figure 2C:
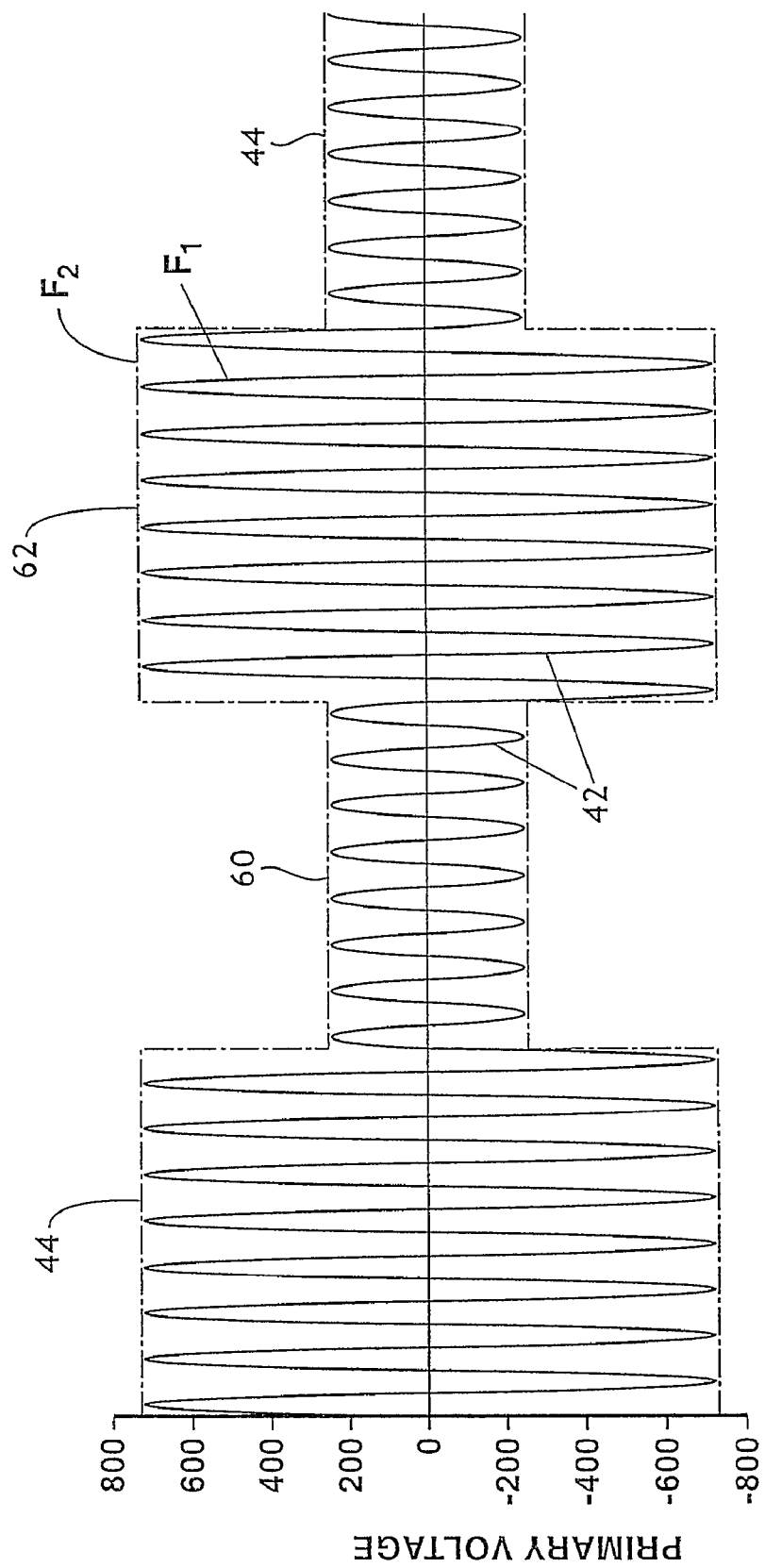
FIG. 2C is similar to FIG. 2 except it shows a voltage pattern applied to a transformer primary when the modulation frequency $F_2$ is a square wave.

FIG. 2 shows the base signal 42 ($F_1$) that is applied to the primary of transformer 36 of the system of FIG. 1 when the amplitude of modulation 44 ($F_2$) is in the form of a sine wave. The frequency of $F_1$ is substantially greater than the frequency of $F_2$. $F_2$ may be in the form of a sine wave, as shown in FIG. 2 or can be in the form of a square wave as seen in FIG. 2C. Modulating signal 44 ($F_2$) can, in addition, be a trapezoidal wave, a triangular-shaped wave, an exponential wave, a logarithmic wave, a semi-circular wave, an inverse semi-circular wave or other symmetrical or non-symmetrical shaped wave. Not only can the shape of $F_2$ vary but also, as to some signal shapes, the tilt of the wave may vary. As an example, a triangular shaped waveform may be symmetrical, that is rise and fall at the same rate, or it could be asymmetrical, such as rising rapidly and falling slowly, or vice versa. In some applications the use of an asymmetrical waveform $F_2$ has a distinct advantage.

Base signal 42 ($F_1$) is shown in FIGS. 2, 2A, 2B and 2C in the shape of a sine wave. This is by example only. In many applications, $F_1$ is essentially a square wave.

It can be seen from FIG. 1 that the electrical energy supplied to electrodes 28 and 30 of vessel 10 consists of an electric field varied at a frequency $F_1$ and simultaneously modulated in intensity at a frequency $F_2$. The structure of FIG. 1 operates as a dual frequency electrostatic coalescence system using a dual frequency method to augment the coalescence of an emulsion.

Returning to FIG. 1, the signal of a type illustrated in FIG. 2 can be created by utilizing a three-phase voltage input 46 feeding a rectifier 48 to produce a DC voltage on voltage bus 50. A modulator 52 converts the DC voltage to a modulation signal 44 ($F_2$) as seen in FIG. 2 that is fed to conductors 54. A chopper circuit 56 then chops up the voltage signal $F_2$ to the higher frequency base voltage signal $F_1$ as seen in FIG. 2. The base voltage signal $F_1$ modulated in intensity by the signal $F_2$ appears on conductors 58 that feed the primary 38 of transformer 36.

The dual frequency waveform appearing at the secondary winding 40 of high voltage transformer 36 can be created in a number of ways. The circuit portion of FIG. 1 as above described, is a system in which a modulation wave form $F_2$ is first created and then chopped to produce the higher frequency base wave form $F_2$. Alternatively, a circuit system similar to an AM radio transmitter can be employed in which the base frequency $F_1$ is created that is then modulated in intensity by a signal $F_2$. The particular electrical circuit system utilized to provide a high voltage dual frequency signal, exemplified by FIGS. 2, 2A, 2B and 2C, is not the subject of this disclosure. Instead, this disclosure is concerned with the concept of applying a dual frequency electrostatic voltage charge to an emulsion to augment coalescence and the particular circuitry by which such dual frequency voltage signal is obtained is not the essence of the invention since circuits to accomplish a dual frequency wave form are well within the skill of the electrical engineering profession.

Circuit components 48, 52 and 56 are by way of illustration only and rudimentarily indicate by way of example, a circuit that can be used to provide a signal represented in FIG. 2.

In practicing this invention, the electrical energy signal applied to electrodes within a treatment vessel is selected in response to the characteristics of the emulsion being treated. It has been determined that improved coalescence of a water-in-oil emulsion is obtained if the base frequency $F_1$ is proportional to the electrical conductivity of the oil component of the emulsion, conductivity being expressed as pS/m. As an example, in an emulsion wherein the conductivity of the oil component is 75,000 pS/m, the preferred base frequency is approximately 1450 Hz.

It has further been determined that coalescence is improved if the modulation frequency $F_2$ increases as water droplets size in the emulsion decreases—that is, small water droplets in the emulsion require the use of a higher modulation frequency than is the case if the droplets in the emulsion are larger. As an example, if the water droplet diameter in the emulsion averages 500 microns, the system more effectively augments coalescence when the modulation frequency or $F_2$ is about 6.4 Hz.

Assuming that the emulsion passing into inlet 12 of the coalescing vessel 10 of FIG. 1 has a characteristic wherein the conductivity of the oil component is 75,000 pS/m and the average diameter of the water droplets is about 500 microns then the signal appearing at the transformer primary 38, or, correspondingly at the output of the transformer secondary 40, should have a base frequency of about 1450 Hz while the modulation frequency $F_2$ should be about 6.4 Hz.

To augment coalescence an electric field requires a threshold voltage, this is, a minimum voltage to initiate coalescence. As used herein the term "threshold voltage" means the lowest voltage level with sufficient energy to initiate coalescence of dispersed water from an emulsion of oil and water. This voltage depends on several oil properties including interfacial tension and conductivity. The theoretical threshold voltage cannot be calculated and is generally best determined experimentally due to its dependence on electrode and vessel geometry.

Contrasted with the threshold voltage is the "critical voltage," that is, the highest voltage which permits coalesced water droplets to separate. Exceeding the critical voltage results in a reduction in the water droplet diameters and stops separation of water from oil. The critical voltage can be estimated from the Stoke's diameter of the water droplets and the interfacial tension.

"Minimum voltage" is related to the threshold voltage and is the lowest voltage 60 applied to the electrodes at the modulation frequency, $F_2$. In practice when the minimum voltage is at or near the threshold voltage maximum droplet diameters can be achieved resulting in maximum separation rates and lowest residual water content in the effluent. "Maximum voltage" is related to the critical voltage and is the highest voltage 62 applied to the electrodes at the modulation frequency, $F_2$. In practice, the maximum voltage can exceed the critical voltage but only for a short duration. Exceeding the critical voltage momentarily permits the smallest dispersed water droplets to be energized and coaxed into participating in the coalescence and separation process.

In practicing the invention herein the minimum voltage 60 should be at or slightly below the threshold voltage and the maximum voltage 62 should be at or slightly above the critical voltage.

Further, as used herein, the term "base frequency" $F_1$ means the minimum frequency required to prevent the full discharge of dispersed water droplets. This frequency is influenced primarily by the conductivity of the oil. The ability to increase the base frequency $F_1$ (above 60 Hz) permits the electrostatic coalescence process to be optimized for a wide range of crude oils. "Modulation frequency" $F_2$ is the natural frequency of the largest water droplet that will form at the minimum voltage. While this frequency may be calculated for any droplet diameter, interfacial tension and droplet mass, in practice it is best determined experimentally due to varying hydraulic efficiencies of different process vessels.

In practicing the method of this invention, $F_1$ may be a frequency in the range about 60 to about 2500 Hz while $F_2$ is preferably in the range of about 0.1 to about 100 Hz. In general, the system of this invention makes use of a base frequency $F_1$ that is generally higher than alternating current fields used in electrostatic coalescers of the past.

In general, it has been determined that for a given emulsion of water and oil of the type that occurs in the production of crude oil, the base frequency $F_1$ is selected by reference to the conductivity of the oil in the emulsion; the modulation frequency $F_2$ is selected by reference to the water droplet mass and/or interfacial tension of the emulsion; the minimum voltage 60 is selected to be near or only slightly below the threshold voltage which is related to the interfacial tension and conductivity of the oil component of the emulsion. The minimum voltage 60 can also vary somewhat according to the vessel geometry.

The critical voltage at which separation stops is determined by reference to the Stoke's diameter of the water droplets that are suspended in the rising oil steam. Maximum voltage 62 should, as previously stated, be near the critical voltage.

"Threshold voltage" and the "critical voltage" as used herein are voltages determined by physical laws and that are controlled by the characteristics of the emulsion being treated, the geometry of the treatment vessel and the flow rates of the emulsion. "Minimum voltage" and "maximum voltages" mean those voltages defining the amplitude of $F_2$ and are voltages selected by an engineer designing a system to practice the dual frequency process disclosed herein. As previously stated, the minimum voltage defining $F_2$ should be near, but not necessarily coincident with the threshold voltage and the maximum voltage defining $F_2$ should be near, but not necessarily coincident with the critical voltage of the emulsion. As previously stated, in some applications the minimum voltage may advantageously be slightly below the threshold voltage and the maximum voltage may be slightly greater than the critical voltage.

Figure 3:
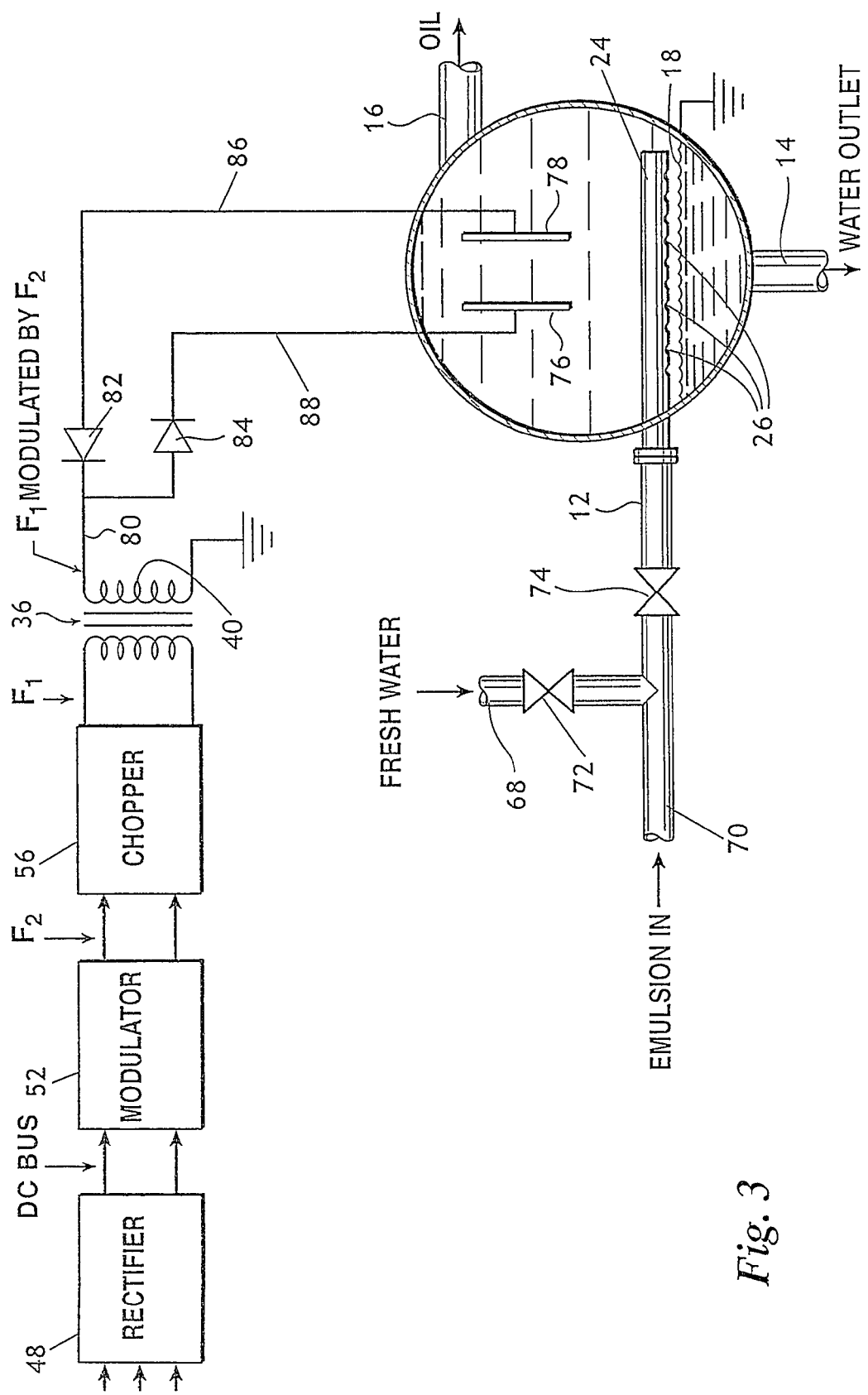
FIG. 3 is an altered embodiment of the basic concept of the invention as shown in FIG. 1. In this embodiment a diode is in series with each electrode so that the voltage waveform, with respect to ground, is a half wave cycle with one electrode having a positive half wave cycle and the other electrode a negative half wave cycle. Further.

FIG. 3 is an alternate embodiment of the method and system of this invention. Sometimes crude oil brought to the earth's surface from a subterranean formation carries with it excessive salt in the form of entrained brine. For efficiency of transportation and refining, it is advantageous to have the salt content reduced. The flow arrangement of the system of FIG. 3 is particularly applicable for coalescence and separation of a water-in-oil emulsion, such as crude oil and further, is also applicable to desalting crude oil. In the system of FIG. 3, fresh water is mixed with crude oil. The fresh water absorbs salt from the emulsion (crude oil). Fresh water is added to the emulsion through a fresh water inlet 68 that merges with emulsion inlet pipe 70 to feed into the vessel emulsion inlet 12. A water control valve 72 in fresh water inlet 68 is used to control the amount of fresh water added to the emulsion passing through inlet 70. The total volume flow into vessel 10 through emulsion inlet 12 is controlled by emulsion inlet valve 74.

Within vessel 10 coalescence is augmented by an electrostatic field to which the emulsion is subject to causing water drops to enlarge and fall out of the emulsion into the area creating the oil/water interface 18. Water is withdrawn through pipe 14. Oil having a significant portion of the entrained water, including the fresh water added from fresh water inlet 68 having salt dissolve therein is thereby taken out before the oil content of the emulsion is discharged through oil outlet 16.

Thus the arrangement of FIG. 3 functions either as a separator enhanced by dual frequency electrostatic coalescence and/or a desalter enhanced by dual frequency coalescence.

In the arrangement of FIG. 3 as compared to FIG. 1, first and second electrodes 76 and 78 are shown oriented vertically with space therebetween through which emulsion flows as it migrates from a lower portion of the vessel interior towards upper oil outlet 16. A dual frequency electrostatic field is formed between electrodes 76 and 78. The actual physical construction of electrodes 76 and 78 can be such that substantially all of the emulsion passes therebetween or is at least subjected to the electrostatic field created by electrical signals applied to the electrodes. The electrodes in FIG. 3 are illustrated diagrammatically.

The output of transformer secondary 40 is fed by a conductor 80 to a first rectifier 82 and, in parallel therewith, a second rectifier 84. Conductor 86 connects rectifier 82 in series with electrode 78 and conductor 88 connects rectifier 84 to electrode 76. The voltage signal applied to each of electrodes 76 and 78 is therefore a half wave rectified signal. FIG. 2A illustrates the waveform of voltage appealing on electrode 76 and FIG. 2B illustrates the wavefront of voltage appearing on electrode 78. Further, one leg of transformer secondary 40 is at ground potential and vessel 10 is typically at ground potential as indicated, so that the electrostatic field established within vessel 10 exists not only between the opposed electrodes 76 and 78 but also between the electrodes and the wall of vessel 10.

When the separator system of FIG. 3 is utilized for desalting, in which fresh water is introduced as has been previously discussed, it is important that the emulsion (more specifically the crude oil having excess salt therein) be thoroughly mixed with the fresh water before the diluted emulsion enters into vessel 10. The emulsion inlet valve 74 is used to regulate the rate of input flow into vessel 10 and also serves the function of mixing the emulsion with fresh water before the diluted emulsion enters the vessel 10. Therefore, valve 74 preferably produces a 5-15 psi pressure drop to achieve its mixing function.

Figure 4:
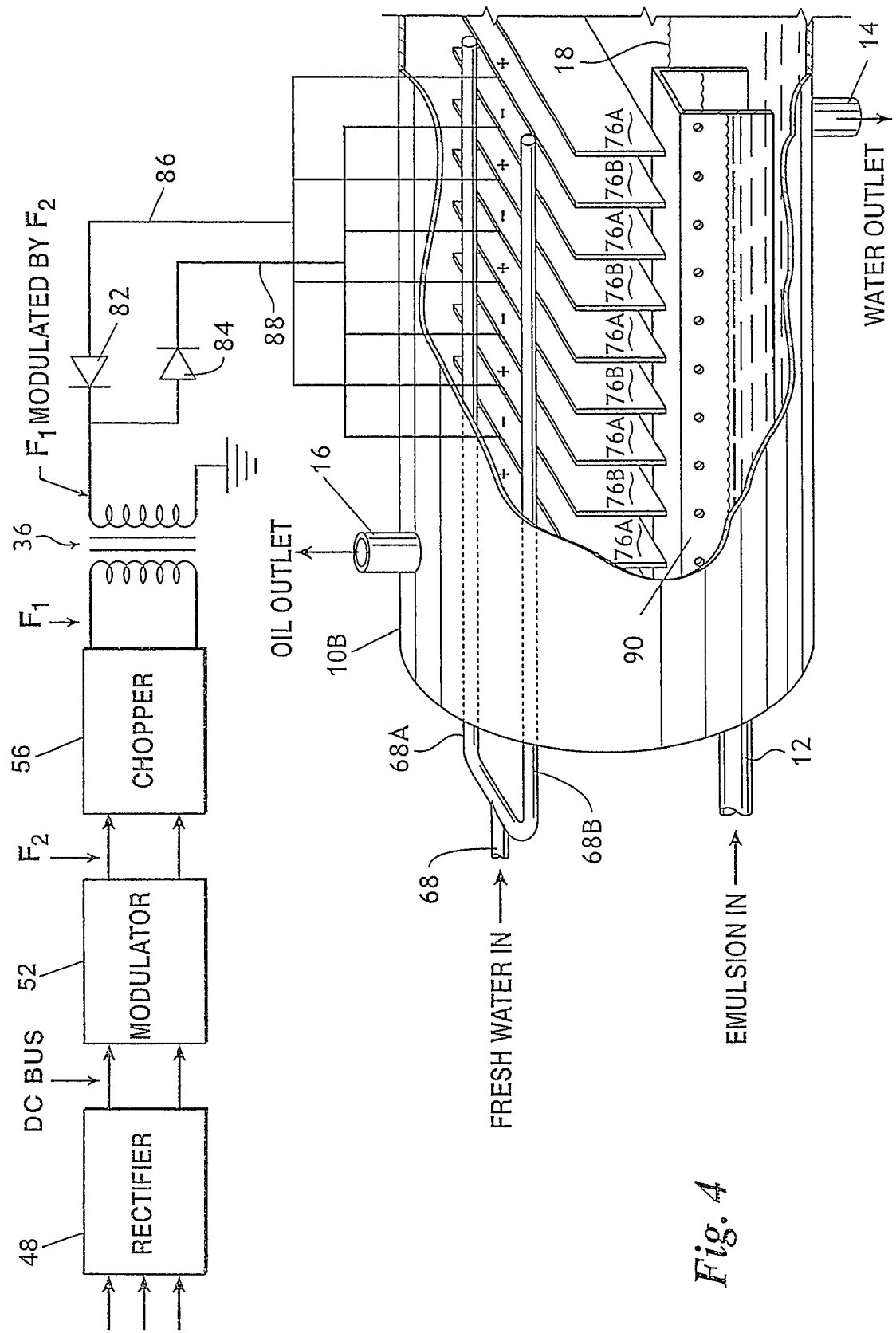
FIG. 4 discloses the method of this invention as applied particularly to a desalting application as has been referenced with respect to FIG. 3 in which fresh water is used in a coalescing environment to reduce the salt content of the oil outlet. A plurality of vertically-positioned, spaced-apart plates provide areas in which electrostatic fields are created by the application of voltage having a base wave form with a basic frequency of $F_1$ is that is modulated in a manner to augment coalescence of droplets of water contained in the emulsion.

Referring to FIG. 4, an embodiment of the invention is illustrated that is particularly applicable for a crude oil desalting application combined with coalescence and separation. In the embodiment of FIG. 4 a plurality of pairs of electrode plates 76A and 76B are illustrated. The plates are vertically oriented to allow vertical passageways therebetween in which emulsion passing therethrough is subject to electrostatic fields. The plates identified by the numeral 76A constitute electrodes that are fed from conductor 88 having rectifier 84 in series therewith so that plates 76A are negatively charged—that is, the signal applied to plates 76A is represented by the lower half of the voltage wave form shown in FIG. 2. Plates 76B are fed by conductor 86 in series with rectifier 82 and are positively charged—that is, the voltage wave form applied to these plates is represented by the wave form in the upper half of the diagram of FIG. 2.

Emulsion inlet pipe 12 connects with a spreader 90 so that the emulsion is distributed above the oil/water interface 18 and the emulsion migrates upwardly between pairs of plates 76A and 76B. Fresh water is introduced through a fresh water supply pipe 68 that branches into pipes 68A and 68B. The branch pipes 68A and 68B have small diameter openings (not seen) therein so that fresh water is introduced above plates 76A and 76B. The fresh water migrates downwardly through the emulsion while the emulsion itself migrates upwardly so that the emulsion and the fresh water is co-mingled in the area between the plates.

The circuitry of the invention herein as exemplified by a rectifier 48, a modulator 52, a chopper 56 and high voltage transformer 36 provides a base signal frequency $F_1$ that is controlled in amplitude by modulator 52 so that the voltage between pairs of plates 76A and 76B varies at a modulation frequency $F_2$ to increase the voltage at a predetermined rate that results in shearing the water droplets in the emulsion to cause the fresh water and sheared water droplets to initially mix whereby excess salt in the emulsion is absorbed by the fresh water. The intensity sequentially changes to cause the water droplets in the emulsion to coalescence and thereby fall out of the emulsion and to collect in the lower portion of the vessel below the oil/water interface 18 to ultimately be drained from the vessel through water outlet 14 while the oil content of the emulsion is passed out through oil outlet 16. In the normal operation of a separator, the oil content is taken out by a collection system near the top of the separator vessel 10B. Thus the system of FIG. 4 employing the unique dual frequency electrical signal supplied on conductors 86 and 88 functions concurrently as a mixer, a coalescer and a separator to thereby more effectively desalt an emulsion while also separating the emulsion into its lighter and heavier components of oil and water.

U.S. Pat. No. 4,606,801 entitled "Electrostatic Mixer/Separator", by Floyd Prestridge et al., illustrates and describes a separator system similar to that of FIG. 4, however, this patent does not teach the unique advantages of the use of a dual frequency voltage. U.S. Pat. No. 4,606,801 provides good background information relating to a multiple plate mixer/separator to which the principles of this invention can be applied.

A good example of the use of electrostatic separation in conjunction with other separation techniques is described in U.S. Pat. No. 4,581,120 entitled "Method and Apparatus for Separating Oilfield Emulsion", issued to Kerry L. Sublette.

The invention has been illustrated and described primarily as it relates to vessels in which an emulsion flows essentially vertically through one or more electric fields. However, the systems and methods employing dual frequency electrostatic coalescence as discussed in this document can be used equally as well in vessels in which emulsion flows horizontally. Electrodes may be placed parallel to each other to establish electric fields through which emulsion passes horizontally or foraminous vertical electrodes can be employed. U.S. Pat. No. 6,391,268 entitled "Energy-Saving Heavy Crude Oil Emulsion-Treating Apparatus" illustrates a type of horizontal vessel and treating system to which the principles of this invention could be applied.

As previously stated, the basic mechanism by which entrained water is separated out of an oil and water emulsion is by gravity. Coalescence augments gravitational separation by causing water droplets to coalesce—that is, merge with each other to form larger water droplets that overcome the surface tension of surrounding oil and thereby allow the force of gravity to cause the water droplets to settle out of the emulsion. Gravity occurs naturally as a consequence of the earth's gravitational field but gravity can also be induced by circumferential flow—that is, by flowing an emulsion in a circular path or more specifically, in a spiral path. This technique is employed in centrifugal separators. The dual frequency coalescence system of this invention can be effectively employed in conjunction with centrifugal separation.

U.S. Pat. No. 5,643,431 entitled "Method for Augmenting the Coalescence of Water in a Water-In-Oil Emulsion" issued to Gary W. Sams, et al., describes in detail a centrifugal system to augment separation of an emulsion similar to that illustrated in FIG. 11.

U.S. Pat. No. 5,575,896 entitled "Method and Apparatus for Oil/Water Separation Using a Dual Electrode Centrifugal Coalescer", issued to Gary W. Sams et al., provides a detailed description of the use of a coalescer/separator vessel of the type shown in FIG. 12.

The results of a conventional electrostatic coalescence process that utilizes a single frequency electrostatic field is illustrated in the following table and is compared to the results of using a dual frequency electrostatic coalescence process:

| Electrostatic Process | Conventional | Dual Frequency |
|---|---|---|
| Oil Flowrate, bopd | 50,000 | 50,000 |
| Water Content, % | 5 | 5 |
| Operating Pressure, bar | 7 | 7 |
| Operating Temperature, C. | 100 | 100 |
| Oil Specific Gravity | 0.93 | 0.93 |
| Oil Viscosity @ 100 C, cp | 8.9 | 8.9 |
| Water Specific Gravity | 1.015 | 1.015 |
| Vertical Oil velocity, m/hr | 8.75 | 8.75 |
| Stoke's Water Diameter, microns | 647 | 647 |
| Oil Conductivity, pS/m | 75,000 | 75,000 |
| Interfacial tension, dynes/cm | 15 | 15 |
| Base Frequency, $F_1$, Hz | 60 | 1450 |
| Modulation Frequency, $F_2$ Hz | — | 2.7 |
| Minimum voltage | — | 17,000 V RMS |
| Maximum voltage | — | 38,400 V RMS |
| Water in Effluent Oil, % | 0.5 | 0.2 |

While the end result, that is 0.2% versus 0.5% water in the effluent may not appear to be dramatic, this difference is highly significant in the operation of petroleum production and refinery processes since this reduction significantly reduces corrosion in pipelines as well as in production and refining equipment. It also reduces refining costs.

As previously stated, the base frequency $F_1$ that is applied to electrodes of a treating vessel to enhance coalescence according to the principles of this invention is related to the conductivity of the emulsion expressed in pS/m. $F_1$ is preferably in the range of about 0.01 to 0.04 times conductivity of the emulsion in pS/m. In the illustrated example in which crude oil has a conductivity level, in pS/m, of 75,000, $F_1$ was selected to be 1450 Hz and thus the ratio is 0.0193, or about the middle of the preferred range. The modulating frequency $F_2$ is related to interfacial tension of the emulsion, and is preferably in the range of about 10 to 60 divided by interfacial tension expressed in dynes/cm. In the illustrated example wherein the crude oil interfacial tension was measured at 15 dynes/cm, the selected modulation frequency $F_2$ was 2.7 Hz giving a constant of 40, again about the middle of the preferred range.

In addition to selectably variable $F_1$ and $F_2$ of the dual frequency system, the designer of a treatment vessel to enhance coalescence of an emulsion must also determine the minimum and maximum modulation voltages. As previously stated, the maximum voltage is preferably about the emulsion critical voltage and thus should be in the range of about 0.8 to 1.2 times the calculated critical voltage which is preferably, when the emulsion is crude oil, about 255,000 times the square root of the emulsion interfacial tension expressed in dynes per cm divided by the water droplet diameter in microns. Using this relationship for the crude oil used in the example given by the table, the critical voltage was calculated to be 38,400 V RMS and this was selected to be the maximum voltage for $F_2$.

While it is theoretically possible to calculate the threshold voltage of an emulsion, as a practical matter it is best directly measured from a sample of the emulsion. For this reason, a user wishing to procure a treatment vessel to enhance coalescence of crude oil usually provides the designer with the threshold voltage of the emulsion, or supplies a sample and the designer determines the threshold voltage in a laboratory. The threshold voltage is the lowest voltage with sufficient energy to cause the water droplets in the emulsion to coalesce into larger sizes to settle out of the emulsion. In the dual frequency coalescence method taught herein the minimum voltage of a modulating signal $F_2$ should be in the range of about 0.8 to 1.2 times the measured threshold voltage. In the dual frequency method as taught the minimum voltage should not be lower than the threshold voltage for any substantial percentage of a cycle since coalescence is essentially stopped during such time, however, in some instances it may be desirable to set the minimum of $F_2$ slightly below the threshold voltage. In the illustrated arrangement, the crude oil being treated had a threshold voltage of 17,000 V RMS and this was selected as the minimum voltage of $F_2$.

Basic concepts regarding the use of AC electrostatic fields to enhance coalescence of water in an oil/water emulsion are described in U.S. Pat. Nos. 3,772,180 and 4,400,253, both issued to Prestridge, and U.S. Pat. No. 4,417,971 issued to Ferrin, et al.

The following additional United States Patent Nos. are incorporated herein by reference: U.S. Pat. Nos. 6,010,634; 4,606,801; 4,702,815; 4,581,120; 5,643,431; 5,575,896; 3,772,180; 4,400,253 and 4,417,971.

The illustrations of the application of the dual frequency electrostatic coalescence methods and systems of this invention including those illustrated and described in combination with other separation techniques are given by way of example and not by limitation as the dual frequency electrostatic coalescence concepts including the systems and methods of this invention may be employed in other unique and useful combinations to achieve improved efficiency and effectiveness of the separation of heavier and lighter components of an emulsion.

To this point the technology of this invention has been illustrated and discussed as it is particularly related to "dual frequency" electrostatic coalescence. It has been established that improved electrostatic coalescence can, in some instances, be enhanced if more than just two, or dual frequencies are used. This improved technology may be termed "multiple frequency electrostatic coalescence." Of course, "dual frequency" is an example of "multiple frequency" when used to describe electrostatic coalescence technology.

Further, it has been learned that rather than a base frequency modulated in intensity by a modulation frequency, that is amplitude modulation, other kinds of modulation can be employed to enhance electrostatic coalescence, such as frequency modulation and combination amplitude modulation and frequency modulation. Such technology will be referred to as "multiple frequency" electrostatic coalescence.

When an applied voltage is modulated it aids in destabilizing the oil-in-water emulsion. Failure to adequately destabilize water droplets in an emulsion is generally responsible for poor dehydration performance. To be effective the voltage should be modulated from a lower threshold voltage to a higher critical voltage. If the voltage is below the threshold level then electrostatic coalescence is essentially stopped. If the voltage is above the critical voltage then droplets are shattered and therefore do not grow to sufficient diameter required to settle out of the emulsion.

A typical multiple frequency separation process utilizes high frequency (800-1600 Hz) power supply in combination with a low frequency (1-20 Hz) modulation. This process can be practiced by converting a 3 phase voltage to a DC bus voltage. The DC voltage is then modulated to provide a low frequency voltage that is then chopping to obtain the desired high frequency. The waveform that is created by this process must have five characteristic features for successful electrostatic coalescence. First, the lowest voltage should be at or near the threshold voltage. The threshold voltage is dependent on the crude oil being processed. Second, the highest voltage which should be near the critical voltage. The critical voltage depends on the droplet size that will settle out of the emulsion. Third, the base frequency $F_1$ is determined by the conductivity of the crude oil. Fourth, the modulation frequency $F_2$ depends on the required droplet size and the interfacial tension of the crude oil and water mixture, that is, the emulsion. When an amplitude modulated, high frequency waveform is rectified by a pair of diodes a positive and negative waveform is created. See FIGS. 2A and 2B. Fifth, the wave characteristic that is, the shape of the modulation is important. This shape can be a sinusoidal wave or a square wave, or a variety of other waveforms as illustrated in FIGS. 5 through 12. Additionally combinations of waveforms such as shown in FIG. 12 can be used.

The positive and negative waveforms may be applied to adjacent electrodes arranged as parallel plates each with an alternate electrical polarity. This arrangement is illustrated in FIG. 3.

This "multiple frequency" method promotes electrostatic coalescence by establishing a high frequency electrostatic field to maximize the electric field strength and a low frequency modulation field to promote dispersed water coalescence to maximum droplet size. The technique has been commercially successful and improves coalescence performance by 30 to 100% over conventional non-modulated coalescence methods.

The waveform as discussed with reference to FIGS. 1 through 4 consist of a low frequency waveform developed by controlling the amplitude of a high frequency waveform. This multiple frequency method modulates the strength of the applied voltage between the lower threshold voltage and the upper critical voltage and has been utilized in numerous pilot trials and at least one successful field trial. The application of the multiple frequency waveform has achieved performance results permitting the processing capacity of established electrostatic separators to be doubled while maintaining the same effluent water content.

Figure 13:
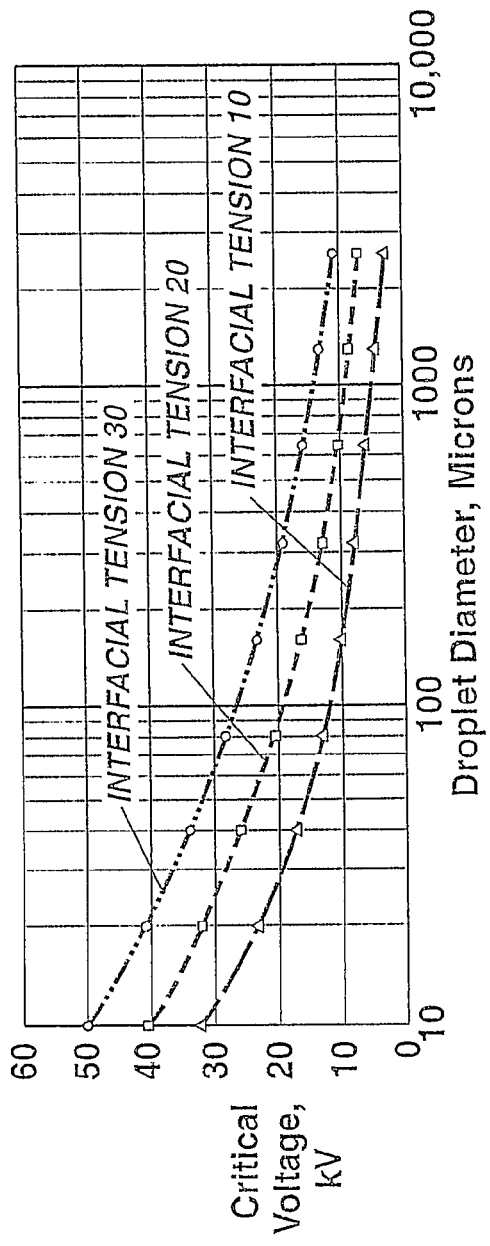
FIG. 13 relates to the importance of the threshold voltage and the critical voltage of a waveform as used in electrostatic coalescence. In addition to variations in the voltage waveform pattern applied to establish electrostatic fields for augmenting the coalescence of water in an oil emulsion, these two characteristics are important. The threshold voltage is the minimum voltage at which coalescence takes place while the critical voltage is the maximum voltage that can be employed without shattering the water droplets in the emulsion. Typically for electrostatic treatment of an emulsion with an alternating current signal, the signal strength needs to vary within the range established by the threshold voltage and the critical voltage.

When a multiple frequency electrostatic coalescer is performing at maximum efficiency the dispersed water is readily coalesced into very large droplets that can easily be shattered by excessive voltages above the critical level. To sustain these large droplets the critical voltage must be reduced. See FIG. 13. The theoretical limit for the critical voltage is the threshold voltage while the practical limit appears to be about 2 kV above the threshold. In several performance tests best results were obtained when the critical voltage was set at a few thousand volts above the threshold voltage.

Figure 14:
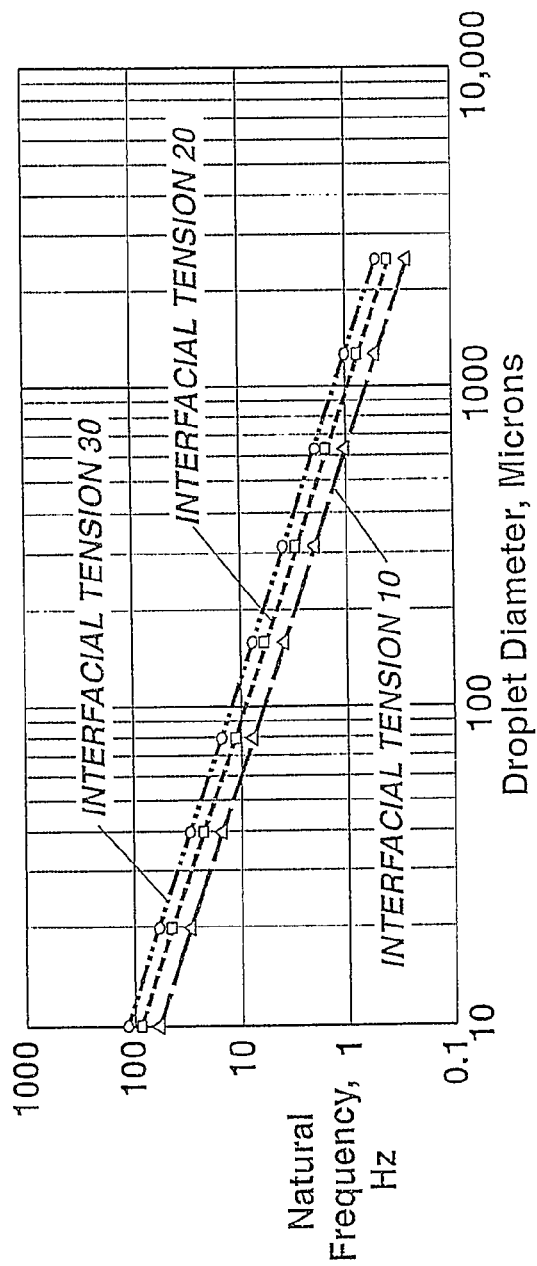
FIG. 14 shows the relationship between a water droplet's natural frequency based on the droplet size and the interfacial tension of the emulsion.
Figure 15:
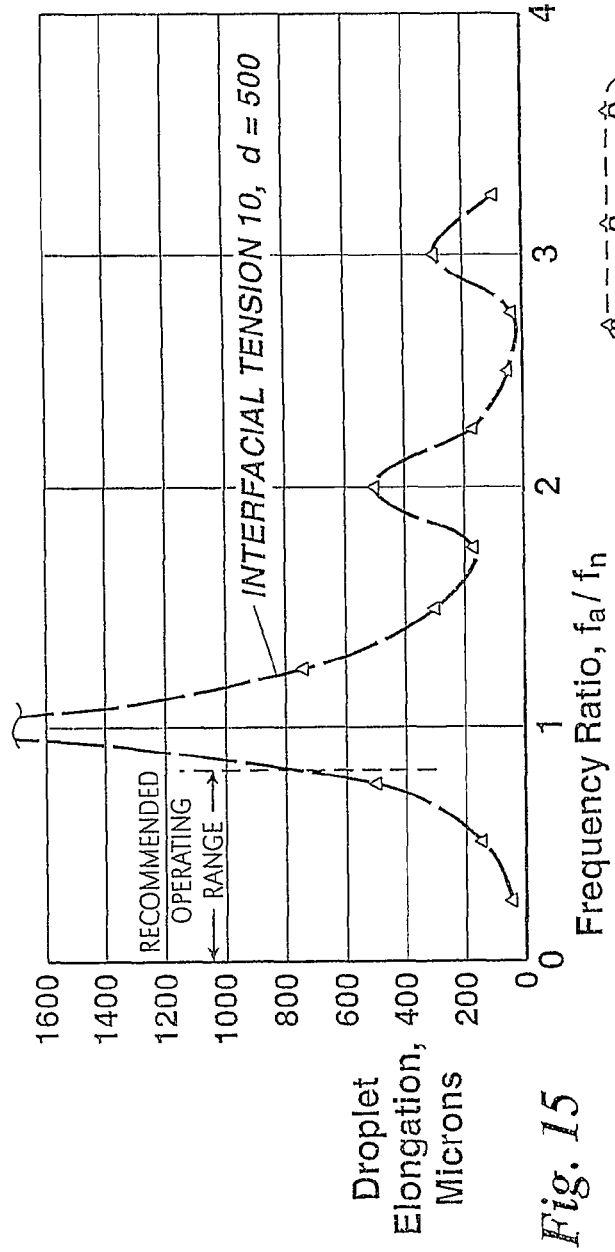
FIG. 15 shows that for maximum droplet coalescence and in agreement with applied physics, the modulation frequency "$F_a$" must be less than the calculated natural frequency "$F_n$" of the largest water droplet. Should the applied modulation frequency $F_a$ exceed a droplet's natural frequency $F_n$ the droplet is excessively elongated and shatters, that is, breaks into smaller droplets, the opposite of desired coalescence. This chart shows the relationship between droplet elongation in microns verses the ration of the modulation frequency to the droplet natural frequency, that is $F_a/F_n$, when the interfacial tensions is ten dynes per centimeter and the drop diameter "d" is 500 microns.
Figure 16:
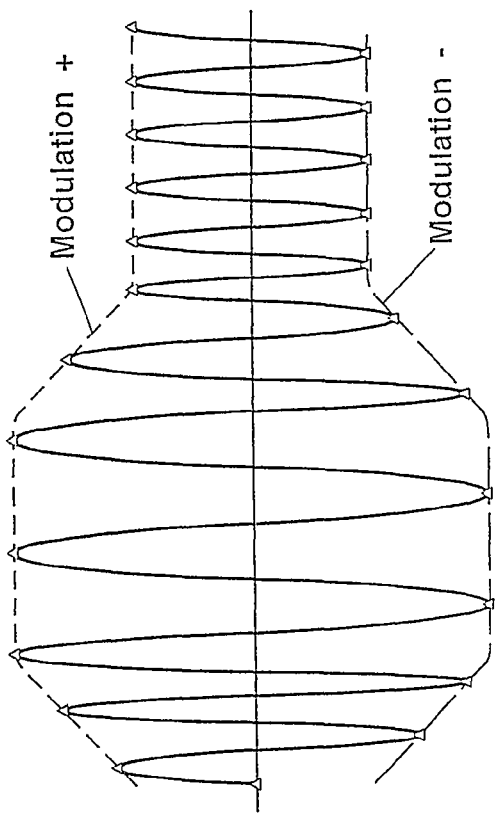
FIG. 16 illustrates the concept that the base frequency can be varied simultaneously with voltage amplitude. In this illustration the voltage signal has a lower frequency with maximum amplitude at a higher frequency with reduced amplitude.

Due to the large water droplets that are produced by the multiple frequency process, it has also been observed that the optimum modulation frequency must be reduced to prevent shattering the droplets. This observation is in agreement with the droplet natural frequency based on the droplet size and the interfacial tension. See FIG. 14. The theoretical limit for the modulation frequency is zero when the droplet growth is maximum. For maximum droplet coalescence and in agreement with applied physics, the ideal modulation frequency must be less than the calculated natural frequency of the largest water droplet. As indicated in FIG. 15, should the applied frequency, $F_a$, coincide with the droplet natural frequency, $F_n$, the droplet is excessively elongated and shattered. See FIG. 15 which illustrates that maximum droplet elongation occurs when the applied frequency is equal to the droplet natural frequency. The practical limit determined experimentally appears to be about 0.1 Hz.

Figure 6:
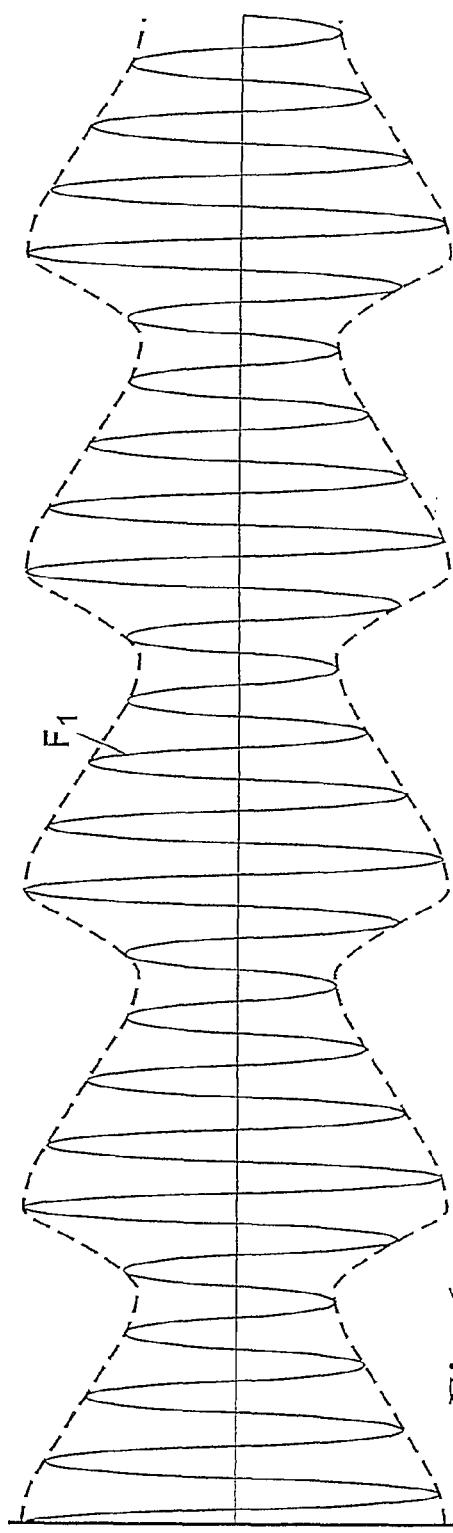
FIG. 6 is a different waveform which shows a base frequency $F_1$ that is essentially sinusoidal wherein the amplitude of the base frequency is modulated in a way to produce a "stair step" pattern.
Figure 7:
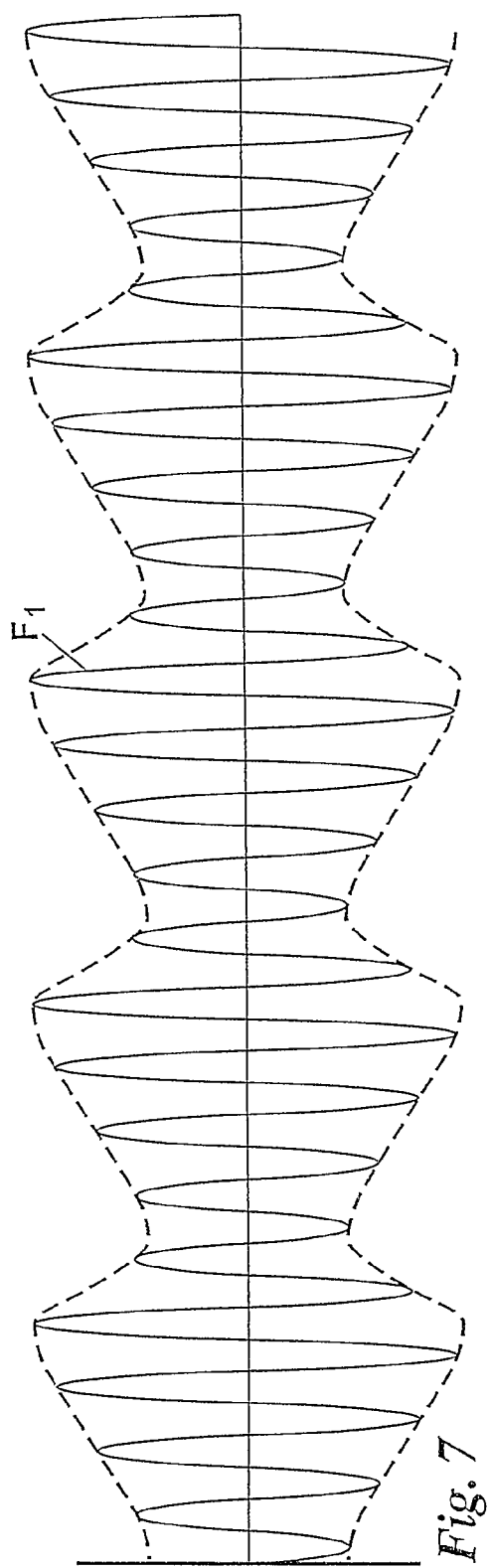
FIG. 7 is an example of a waveform that is the obverse of FIG. 6 wherein the amplitude of $F_1$ increases gradually and then more suddenly decreases. In this embodiment the water droplets of the emulsion are more slowly destabilized and the coalescence takes place in a shorter length of time. This type of wave form is successfully employed when treating low conductivity crude.
Figure 8:
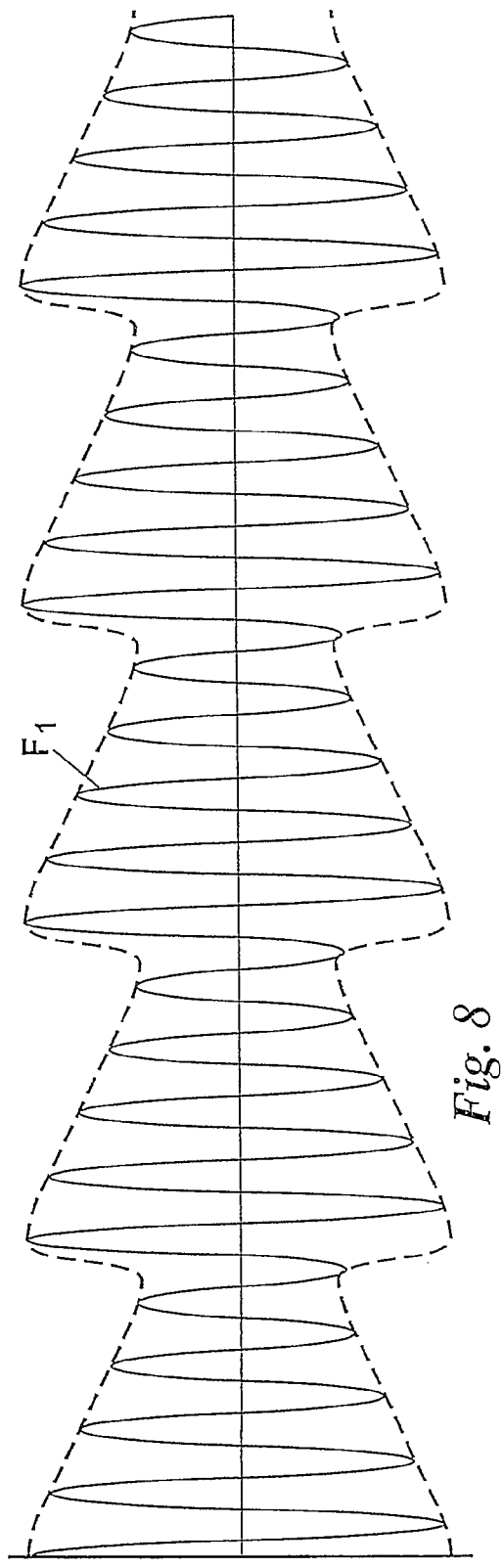
FIG. 8 is a waveform pattern like that of FIG. 6 except the rising portion is much more rapid compared to the declining portion.

While the modulation frequency is selected based on the droplet size and the interfacial tension, the conductivity of the crude oil controls the electrostatic behavior of the water droplets. Skewing a symmetric waveform to produce a unique waveform creates two additional frequencies. FIGS. 6 through 11 illustrate skewed waveforms. In crude oil with low conductivity skewing the modulation waveform to increase the voltage rapidly followed by a slow voltage decline such as shown in FIGS. 6, 8 and 10 and most graphically in FIG. 8, maximizes the electrostatic energy. In highly conductive crude oil, the voltage should increase slowly to prevent droplet shattering following by a rapid voltage decline such as shown in FIGS. 7 and 11. Testing has confirmed that some crude oils respond best to a high frequency increasing voltage such as shown in FIGS. 7 and 11, while others require a high frequency decreasing voltage such as shown in FIGS. 6, 8 and 10.

Applying the multiple frequency method to the coalescence of dispersed water in crude oil has demonstrated that modulating the voltage between the threshold voltage and the critical voltage promotes an aggressive droplet growth. However, as this coalescence is achieved it has also been observed that the maximum voltage must be reduced to control the droplet size. It has also been observed that establishing a correct charging frequency and a separate, correct coalescing frequency in the modulation waveform is highly beneficial to the coalescence process. As FIGS. 14 and 15 show, there is a strong correlation between the applied frequency and droplet growth. Since modulation of the electrostatic field strength must be minimized to optimize droplet coalescence, it is observed that further droplet growth can be achieved by modulating the electrostatic field frequency. Sweeping the frequency over a broad spectrum such as by use of frequency modulated waveform illustrated in FIGS. 5 and 12 promotes significant destabilization of the greatest droplet population. The smallest dispersed water droplets are destabilized at the highest frequency. As this frequency decays, larger droplets will begin to destabilize and coalesce forming larger droplets until the frequency is at the lowest level. This concept of "frequency modulation" is shown in FIGS. 5 and 12.

Figure 5:
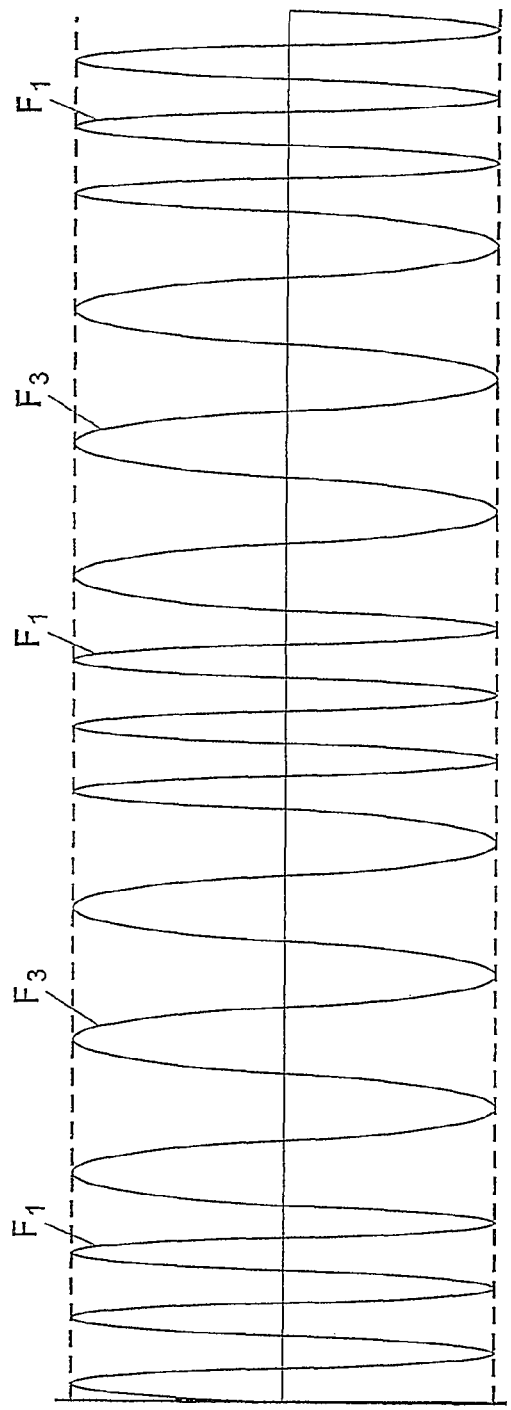
FIG. 5 illustrates a waveform that includes a different type of modulation compared to the waveform of FIG. 2. In this waveform the amplitude stays essentially constant while the base frequency sequentially varies. Specifically, the wave form varies from a frequency $F_1$ to a frequency $F_3$ on a periodic that is, it is frequency modulator. This type of modulation is referred to as frequency modulation as is commonly employed in "FM" radio transmission.

Sweeping the frequency across a broad spectrum such as shown in FIGS. 5 and 12 is comparable with modulating the voltage intensity between the threshold and critical levels. However, as has been explained when the droplet population has shifted to larger droplet sizes the threshold voltage and the critical voltage begin to approach each other making aggressive voltage levels destructive.

Theoretically, water droplets of all sizes can only exist at a modulation frequency of 0 Hz at the threshold voltage. As the modulation frequency increases the larger water droplets begin to shatter due to harmonic destruction. On the other hand, once these droplets are destabilized they will readily coalesce into larger droplets and separate out of the emulsion. Sweeping from a frequency near 0 Hz to a frequency near 50 Hz will destabilize a large population of dispersed water droplets. See FIG. 14. Disrupting the exterior water droplet film destabilizes the dispersed water droplets making it possible to achieve greater droplet growth (coalescence) than is possible with only voltage modulation.

Combining the modulation of frequency with the modulation of voltage can achieve greater water droplet instability and coalescence than either type of modulation used alone. The variation between the upper and lower frequency can occur at a third 'cyclic' frequency to increase droplet coalescence. See FIG. 12.

The base frequency can be varied as necessary for effective coalescence between 0 and 2500 Hz. The optimum range is between 100 and 1600 Hz. The base frequency can be varied simultaneously with the voltage amplitude. See FIG. 12. The base frequency can also be shifted from 0 to 180 degrees to provide a further tool promoting droplet growth. Modulation frequency can be held constant at any frequency including 0 Hz. Modulation frequency must always be less than the base frequency $F_1$ but can vary from 0 Hz to 100 Hz. The optimum modulation frequency is between 0.1 and 60 Hz.

When the modulation waveform is skewed, such as shown in FIGS. 5 through 11, the modulation frequency is an average consisting of a combination of a higher and a lower frequency. The high frequency may be on the leading edge or trailing edge of the waveform.

For example, if the voltage ramps up at a frequency of 30 Hz and ramps down at a frequency of 2 Hz, the average frequency is 3.75 Hz. At an amplitude modulation frequency of 0 Hz and with the applied voltage near the threshold level, the base frequency can be frequency modulated over a wide range to promote droplet coalescence, such as by using the waveform of FIG. 5. At an amplitude modulation frequency greater than 0 Hz, the base frequency can also be frequency modulated over a wide range from a lower base frequency to a higher base frequency. For example, the base frequency might be varied between 1600 Hz and 500 Hz and the oscillation frequency might be equivalent to the modulation frequency.

The invention can be practiced to include frequency modulation, such as illustrated in the waveforms of FIGS. 5 and 12, by the use of frequency modulation circuitry well known to the skilled engineer and exemplified in the practice of frequency modulated ratio transmission and reception. Frequency modulation can be achieved by substituting frequency modulation equipment for modulator 52 and chopper 56 of FIGS. 1 and 3. Modulator 52 in these Figures includes the capacity to provide frequency modulation.

The claims and the specifications describe the invention presented and the terms that are employed in the claims draw their meaning from the use of such terms in the specification. The same terms employed in the prior art may be broader in meaning than specifically employed herein. Whenever there is a question between the broader definitions of such terms used in the prior art and the more specific use of the terms herein, the more specific meaning is meant.

The invention is not limited to the circuits, waveforms, and graphs illustrated and described herein but is to be limited only by the scope of the claims attached hereto, including the full range of equivalency to which each element or step is entitled.

What is claimed is:

1. A method of separating gaseous components, heavier liquid components and lighter liquid components of a stream, comprising:

conducting the stream between spaced apart electrodes in a treatment vessel;

supplying from a voltage source an AC voltage of at least one base frequency $F_1$ to at least one of said electrodes to establish an electric field within said vessel through which the stream passes;

modulating the frequency $F_1$ of said AC voltage at a modulation frequency $F_2$;

withdrawing separated gaseous components from an upper portion of said vessel, heavier stream components from a lower portion of said vessel, and lighter liquid components from an intermediate portion of said vessel.

2. A method of separating gaseous components, heavier liquid components and lighter liquid components of a stream according to claim 1 wherein $F_1$ and $F_2$ are separately selected in accordance with separate characteristics of said heavier and lighter liquid components.

3. A method of separating gaseous components, heavier liquid components and lighter liquid components of a stream according to claim 1 wherein said frequency of modulation $F_2$ varies from a selected threshold frequency.

4. A method of separating gaseous components, heavier liquid components and lighter liquid components of a stream according to claim 1 wherein one of said electrodes is at ground potential.

5. A method of separating gaseous components, heavier liquid components and lighter liquid components of a stream according to claim 1 wherein said AC voltage has a format selected from the group comprising a sine wave, a square wave, a triangular shaped wave, a trapezoidal shaped wave, an exponentially shaped wave, a logarithmically shaped wave, a semi-circular shaped wave and an inverse semi-circular shaped wave and combinations thereof.

6. A method of separating gaseous components, heavier liquid components and lighter liquid components of a stream according to claim 1 wherein $F_1$ is influenced by the conductivity of the stream.

7. A method of separating gaseous components, heavier liquid components and lighter liquid components of a stream according to claim 1 wherein $F_2$ is essentially determined by droplet mass and/or the interfacial tension of the liquid components.

8. A method of separating gaseous components, heavier liquid components and lighter liquid components of a stream according to claim 1 wherein $F_2$ is in the range of near 0 to about 60 Hz.

9. A method of separating gaseous components, heavier liquid components and lighter liquid components of a stream according to claim 1 wherein $F_1$ is in a preferred range of about 100 to 1600 Hz.

10. A method of separating gaseous components, heavier liquid components and lighter liquid components of a stream according to claim 1 wherein $F_1$ is modulated concurrently in intensity and frequency.

11. A method of separating gaseous components, heavier liquid components and lighter liquid components of a stream according to claim 1 wherein said AC voltage is cyclically modulated in amplitude in a wave form in which in the first half of each cycle the intensity of the AC voltage increases at a slow exponential rate and in the second half of each cycle the intensity of the AC voltage decreases at a fast exponential rate.

12. A method of separating gaseous components, heavier liquid components and lighter liquid components of a stream according to claim 1 wherein said AC voltage is cyclically modulated in amplitude in a wave form in which in the first half of each cycle the intensity of the AC voltage increases at a high exponential rate and in the second half of each cycle the intensity of the AC voltage decreases at a low exponential rate.

13. A method of separating gaseous components, heavier liquid components and lighter liquid components of a stream according to claim 1 wherein said AC voltage is cyclically modulated in amplitude in a wave form in which in the first half of each cycle the intensity of the AC voltage increases exponentially and in the second half of each cycle the intensity of the AC voltage decreases exponentially.

14. A method of separating gaseous components, heavier liquid components and lighter liquid components of a stream according to claim 1 in which said AC voltage remains at a substantially constant intensity and in which the frequency $F_1$ thereof varies cyclically between a higher frequency and a lower frequency and in which the higher frequency and lower frequency variation occur at a selected frequency $F_2$.

15. A method of separating gaseous components, heavier liquid components and lighter liquid components of a stream according to claim 1 wherein said AC voltage is cyclically modulated in amplitude in a wave form in which in the first half of each cycle the intensity of the AC voltage increases at a high linear rate and in the second half of each cycle the intensity of the AC voltage decreases at a low linear rate.

16. A method of separating gaseous components, heavier liquid components and lighter liquid components of a stream according to claim 1 wherein said AC voltage is cyclically modulated in amplitude in a wave form in which in the first half of each cycle the intensity of the AC voltage increases at a low linear rate and in the second half of each cycle the intensity of the AC voltage decreases at a high linear rate.

17. A method of separating gaseous components, heavier liquid components and lighter liquid components of a stream according to claim 1 wherein said AC voltage in cyclically modulated in amplitude in a wave form in which in the first half of each cycle the intensity of the AC voltage increases substantially linerally and in the second half of each cycle the intensity of the AC voltage decreases substantially linerally.

18. A method of separating gaseous components, heavier liquid components and lighter liquid components of a stream according to claim 1 in which said AC voltage $F_1$ varies cyclically in intensity between a lower and a higher intensity and in which the frequency thereof varies cyclically between a higher frequency and a lower frequency and in which the higher frequency and lower frequency variation occur at a selected frequency $F_2$.

19. A method of separating gaseous components, heavier liquid components and lighter liquid components of a stream according to claim 1 in which said AC voltage $F_1$ varies cyclically in intensity between a lower and a higher intensity and in which the frequency of the AC voltage simultaneously varies cyclically between a higher frequency and a lower frequency and wherein said frequency variations $F_2$ occur cyclically in register with said AC voltage cyclic intensity variations $F_1$.

20. A method of desalting a salty hydrocarbon stream having gaseous components, water components and oil components comprising:

flowing the salty hydrocarbon stream into a separation vessel;

providing a plurality of substantially paralleled spaced apart electrodes within said vessel;

providing an AC voltage source of selectable frequency;

in response to the characteristics of the stream employing from said AC voltage source an AC voltage of base frequency $F_1$;

applying said AC voltage of frequency $F_1$ to said electrodes to thereby establish an electric field between adjacent electrodes;

cyclically modulating the frequency of $F_1$ at a modulation frequency $F_2$;

conducting said salty hydrocarbon stream between adjacent of said electrodes;

flowing fresh water into said vessel between adjacent said electrodes counter current to the flow of said salty hydrocarbon stream;

withdrawing separated gaseous components from an upper portion of said vessel;

withdrawing water components from a lower portion of said vessel; and withdrawing reduced salty oil components from an intermediate portion of said vessel.

* * * * *